United States Patent
Mazur et al.

(10) Patent No.: US 12,222,686 B2
(45) Date of Patent: Feb. 11, 2025

(54) APPLICATION DRIVEN ENHANCEMENT TO INDUSTRIAL AUTOMATION DEVICE VIA CONTAINER IMPLEMENTATION

(71) Applicant: ROCKWELL AUTOMATION TECHNOLOGIES, INC., Mayfield Heights, OH (US)

(72) Inventors: David C. Mazur, Mequon, WI (US); Rob A. Entzminger, Shawnee, KS (US); Roberto S. Marques, Cedarburg, WI (US); Bruce T. McCleave, Jr., Mission Viejo, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/950,894

(22) Filed: Sep. 22, 2022

(65) Prior Publication Data
US 2024/0103455 A1    Mar. 28, 2024

(51) Int. Cl.
*G05B 19/042*     (2006.01)
*G05B 11/01*      (2006.01)
*G05B 15/02*      (2006.01)

(52) U.S. Cl.
CPC .............. *G05B 11/01* (2013.01); *G05B 15/02* (2013.01); *G05B 19/0426* (2013.01)

(58) Field of Classification Search
USPC .......................................................... 700/86
See application file for complete search history.

(56) References Cited

U.S. PATENT DOCUMENTS 7,464,260 B2    12/2008    Milligan et al.
7,805,766 B2    9/2010     Christensen et al.
(Continued)

FOREIGN PATENT DOCUMENTS

EP    3454212 A1    3/2019
EP    3761166 A1    1/2021
(Continued)

OTHER PUBLICATIONS

Marshall, "Industry 4.0: The PLC evolves from Controller to Cloud Interface" Feb. 9, 2018, accessed at https://www.rs-online.com/designspark/evolution-of-the-industrial-plc-from-controller-to-cloud-interface 13 pg. printout (Year: 2018).*
(Continued)

*Primary Examiner* — Emilio J Saavedra
(74) *Attorney, Agent, or Firm* — Fletcher Yoder, P.C.

(57) ABSTRACT

An industrial automation device includes first processing circuitry configured to perform a first set of operations associated with controlling the industrial automation device or one or more industrial automation devices communicatively coupled to the industrial automation device. The industrial automation device includes input/output circuitry communicatively couplable to an electronic device having second processing circuitry that is configured to execute computer-readable instructions to execute a software container and receive, in the software container, data from the industrial automation device, the one or more industrial automation devices, or both. The second processing circuitry executes the computer-readable instructions to perform, using the software container, a second set of operations associated with controlling the industrial automation device or the one or more industrial automation devices. The second processing circuitry is also executes the computer-readable instructions to adjust an operation of the industrial automation device based on the second set of operations.

20 Claims, 8 Drawing Sheets

(56) References Cited

U.S. PATENT DOCUMENTS

| | | | |
|---|---|---|---|
| 9,595,896 | B1 | 3/2017 | Royak et al. |
| 10,715,388 | B2 | 7/2020 | Fildebrandt et al. |
| 11,182,206 | B2 | 11/2021 | Jung et al. |
| 11,474,873 | B2 | 10/2022 | Biernat et al. |
| 11,513,877 | B2 | 11/2022 | Biernat et al. |
| 2015/0149783 | A1* | 5/2015 | Clark ............... G06F 21/00 713/175 |
| 2018/0024537 | A1 | 1/2018 | Chauvet et al. |
| 2018/0054469 | A1 | 2/2018 | Simoncelli |
| 2019/0199086 | A1* | 6/2019 | Li ............... H02H 7/1225 |
| 2019/0377604 | A1 | 12/2019 | Cybulski |
| 2020/0136906 | A1 | 4/2020 | Bernat et al. |
| 2020/0249928 | A1 | 8/2020 | Zeng et al. |
| 2020/0278892 | A1 | 9/2020 | Nainar et al. |
| 2020/0311617 | A1 | 10/2020 | Swan et al. |
| 2020/0379938 | A1 | 12/2020 | Poulsen et al. |
| 2021/0019416 | A1* | 1/2021 | Höfele ............... G06F 21/563 |
| 2021/0081934 | A1 | 3/2021 | Huang et al. |
| 2021/0200814 | A1 | 7/2021 | Tal et al. |
| 2021/0218617 | A1 | 7/2021 | Palavalli et al. |
| 2021/0382727 | A1 | 12/2021 | Vigil et al. |
| 2022/0027721 | A1 | 1/2022 | Thoemmes et al. |
| 2022/0091572 | A1 | 3/2022 | Biernat et al. |
| 2022/0091583 | A1 | 3/2022 | Biernat et al. |
| 2022/0141199 | A1* | 5/2022 | Falk ............... H04L 43/0858 713/171 |
| 2022/0308859 | A1* | 9/2022 | Koziolek ............... G06F 9/455 |
| 2023/0324870 | A1 | 10/2023 | Goetz et al. |
| 2024/0004688 | A1* | 1/2024 | Shigemori ............... G06F 9/45558 |
| 2024/0095002 | A1* | 3/2024 | Waterman ............... G06F 8/61 |
| 2024/0095041 | A1* | 3/2024 | Waterman ............... G06F 9/4415 |

FOREIGN PATENT DOCUMENTS

| | | |
|---|---|---|
| EP | 3882766 A1 | 9/2021 |
| KR | 20200027783 A | 3/2020 |
| WO | 2020184362 A1 | 9/2020 |

OTHER PUBLICATIONS

Pallasch et al., "Edge Powered Industrial Control Concept for combining cloud and automation technologies" 2018 IEEE International Conference on Edge Computing, Jul. 2-7, 2018, pp. 130-134 (Year: 2018).*

Morgan et al., "Industry 4.0 smart reconfigurable manufacturing machines" Journal of Manufacturing Systems 59 (2021) pp. 481-506 (Year: 2021).*

Rockwell Automation, "Allen-Bradley PowerFlex Adjustable Frequency AC Drive vol. 1 PowerFlex 70 PowerFlex 700 Standard Control Vector Control" Reference Manual, 2003, 261 pages (Year: 2003).*

Star Automation, "What is Modular PLC" 7 minute 37 second YouTube video, Published Mar. 31, 2018, accessed at https://www.youtube.com/watch?v=IY3c1jp0MtY, (1 pg. screenshot Prinout at 6 minutes 1 second, is attached) (Year: 2018).*

Extended European Search Report for European Patent Application No. 21179775.8, dated Nov. 25, 2021, 9 pages.

Partial European Search Report for European Patent Application No. 21180068.5, dated Dec. 8, 2021, 17 pages.

Marshall, "Industry 4.0: The PLC evolves from Controller to Cloud Interface," Feb. 9, 2018, https://www.rs-online.com/designspark/evolution-of-the-industrial-plcfrom-controller-to-cloud-interface , retrieved on Nov. 29, 2021, pp. 1-6.

European Search Report for European Patent Application No. 21180068.5, dated Mar. 28, 2022,19 Pages.

Anonymous, "Pull an Image from a Private Registry", Kubernetes, retrieved on Mar. 18, 2022, 5 Pages, https://web.archive.org/web/20171003051312/https://kubernetes.io/docs/tasks/configure-pod-container/pull-image-private-registry/.

European Search Report for European Patent Application No. 21180279.8, dated Apr. 19, 2022, 12 Pages.

D. Elliott, C. Otero, M. Ridley and X. Merino, "A Cloud-Agnostic Container Orchestrator for Improving Interoperability," 2018 IEEE 11th International Conference on Cloud Computing (Cloud), 2018, pp. 958-961, doi: 10.1109/CLOUD.2018.00145. (Year: 2018).

A. Khan, "Key Characteristics of a Container Orchestration Platform to Enable a Modern Application," in IEEE Cloud Computing, vol. 4, No. 5, pp. 42-48, Sep./Oct. 2017, doi: 10.1109/MCC.2017.4250933. (Year: 2017).

Liu, Y. et al., "A Data-Centric Internet of Things Framework Based on Azure Cloud," IEEE Access, vol. 7, Mar. 27, 2019, 20 pages.

Extended European Search Report for Application No. 23187513.9 mailed Feb. 19, 2024, 10 pages.

* cited by examiner

APPLICATION DRIVEN ENHANCEMENT TO INDUSTRIAL AUTOMATION DEVICE VIA CONTAINER IMPLEMENTATION

BACKGROUND

This disclosure relates generally to industrial automation, and, more specifically, to employing software containers within industrial automation systems.

Industrial automation systems are managed and operated using automation control and monitoring systems (e.g., industrial control system), particularly in industrial automation environments. Such applications may include controlling a wide range of components, such as valves, electric motors, and so forth, and the collection of data via sensors. Typical industrial control systems may include one or more components, such as programming terminals, automation controllers, input/output (I/O) modules, communication networks, human-machine interface (HMI) terminals, and the like.

Generally, industrial control systems that operate in the operational technology (OT) environment are used to control industrial devices accessible via an OT network. Although the industrial control systems may be used to manage the operations of the devices within the OT network, the control systems may be limited in the control operations that can be performed, and sending data between devices and the controller may utilize an undesirable amount of bandwidth within the OT network. For instance, the OT network may be connected to an information technology (IT) network that includes one or more computing devices located in a different physical location than the OT network. While the devices of the IT network may be utilized to analyze data received from the OT network, relatively large amounts of communication bandwidth may be utilized to communicate data between the OT network and the IT network.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one embodiment, an industrial automation device includes processing circuitry and a non-transitory computer-readable medium that includes instructions that, when executed by the processing circuitry of the industrial automation device, cause the processing circuitry to execute a software container and receive, at the software container, data from one or more industrial automation devices communicatively coupled to the industrial automation device. The instructions, when executed, also cause the processor to determine, using the software container, one or more control operations for the industrial automation device or the one or more industrial automation devices based on the data. Furthermore, the instructions, when executed, cause the processor to cause the industrial automation device to perform the one or more control operations or send the one or more control operations to the one or more industrial automation devices.

In another embodiment, a non-transitory computer-readable medium includes instructions that, when executed by processing circuitry, cause the processing circuitry to execute a software container and receive, at the software container, data from one or more industrial automation devices communicatively coupled to the industrial automation device. The instructions, when executed, also cause the processor to determine, using the software container, one or more control operations for the industrial automation device or the one or more industrial automation devices based on the data. Furthermore, the instructions, when executed, cause the processor to cause the industrial automation device to perform the one or more control operations or send the one or more control operations to the one or more industrial automation devices.

In yet another embodiment, an industrial automation system includes one or more industrial automation devices and a drive that is communicatively coupled to the one or more industrial automation devices. The drive includes a motor configured to provide power to the one or more industrial automation devices. The drive also includes processing circuitry and a non-transitory computer-readable medium that includes instructions that, when executed by the processing circuitry of the industrial automation device, cause the processing circuitry to execute a software container and receive, at the software container, data from one or more industrial automation devices communicatively coupled to the industrial automation device. When executed, the instructions also cause the processing circuitry to determine, using the software container, one or more control operations for the industrial automation device or the one or more industrial automation devices based on the data. Furthermore, when executed, the instructions cause the processing circuitry to cause the industrial automation device to perform the one or more control operations or send the one or more control operations to the one or more industrial automation devices.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
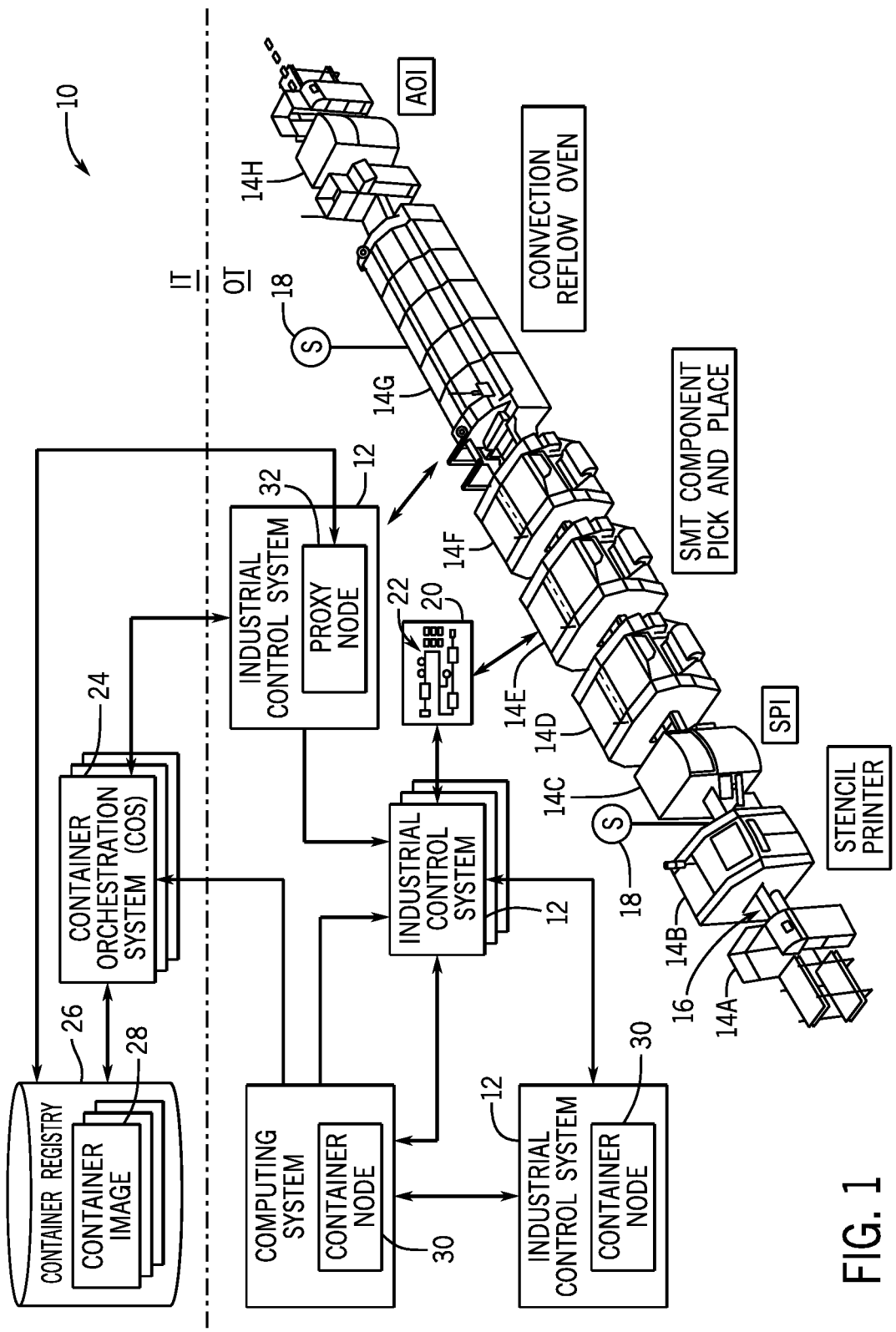
FIG. 1 is a perspective view of an example industrial automation system, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present application is generally directed to techniques that may be implemented in industrial automation systems that employ (software) containers, which are packages of software that may visualize an operating system and be deployed and run on one or more computing devices. As discussed herein, containers may be implemented on automation devices to replace existing components, add features and functionality (e.g., to devices that may otherwise not be modified), and improve communication (e.g., reduce latency) within industrial automation systems. For example, a container node may unpack a container image and push the resultant package to an industrial automation device in an industrial control system such that the industrial control system (or, more specifically, the device) executes the package in response to receiving it from the container node. As such, controllers within industrial automation systems may be containerized, meaning a physical device (e.g., controller) may be replaced by a software container that can perform all of the operations that the physical device would perform (e.g., to control devices within the industrial automation system). As also described below, in some cases, a container may be implemented on a device by communicatively coupling the device to other hardware onto which the container is installed. Moreover, as also discussed herein, software containers may also be utilized to expand the capabilities of devices in industrial automation systems to enable the devices to perform operations that may otherwise not be performable. Furthermore, as described below, containers may also be utilized to enable devices in the OT side industrial automation systems to analyze data (e.g., perform analytics) that otherwise may have been evaluated in the IT side of the industrial automation systems (e.g., using cloud computing resources).

By way of introduction, FIG. 1 is a perspective view of an example industrial automation system 10 controlled by one or more industrial control systems 12. The industrial automation system 10 includes stations 14 having machine components and/or machines to conduct functions within an automated process, such as silicon wafer manufacturing, as is depicted. The automated process may begin at a station 14A used for loading objects, such as substrates, into the industrial automation system 10 via a conveyor section 16. The conveyor section 16 may transport the objects to a station 14B to perform a first action, such a printing solder paste to the substrate via stenciling. As objects exit from the station 14B, the conveyor section 16 may transport the objects to a station 14C for solder paste inspection (SPI) to inspect printer results, to station 14D, station 14E, and station 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment. Clearly, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of operational technology (OT) data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 14, may be monitored and controlled by the industrial control systems 12 for regulating control variables. For example, sensing devices (e.g., sensors 18) may monitor various properties of the industrial automation system 10 and may be used by the industrial control systems 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 12 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 12 may be communicatively coupled to a display/operator interface 20 (e.g., a human-machine interface (HMI)) and to devices of the industrial automation system 10. It should be understood that any suitable number of industrial control systems 12 may be used in a particular industrial automation system 10 embodiment. The industrial control systems 12 may facilitate representing components of the industrial automation system 10 through programming objects that may be instantiated and executed to provide simulated functionality similar or identical to the actual components, as well as visualization of the components, or both, on the display/operator interface 20. The programming objects may include code and/or instructions stored in the industrial control systems 12 and executed by processing circuitry of the industrial control systems 12. The processing circuitry may communicate with memory circuitry to permit the storage of the component visualizations.

As illustrated, a display/operator interface 20 depicts representations 22 of the components of the industrial automation system 10. The industrial control system 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control system 12. As such, a process loop may be activated based on process inputs (e.g., an input from the sensor 18) or direct input from a person via the display/operator interface 20. The person operating and/or monitoring the industrial automation system 10 may reference the display/operator interface 20 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 18 may gather OT data indicative of one or more operations of the industrial automation system 10 or the industrial control system 12. In this way, the OT data may be analog data or digital data indicative of measurements, statuses, alarms, or the like associated with operation of the industrial automation system 10 or the industrial control system 12.

The industrial control systems 12 described above may operate in an OT space in which OT data is used to monitor and control OT assets, such as the equipment illustrated in the stations 14 of the industrial automation system 10 or other industrial equipment. The OT space, environment, or network generally includes direct monitoring and control operations that are coordinated by the industrial control system 12 and a corresponding OT asset. For example, a programmable logic controller (PLC) may operate in the OT network to control operations of an OT asset (e.g., drive, motor). The industrial control systems 12 may be specifically programmed or configured to communicate directly with the respective OT assets.

A container orchestration system 24, on the other hand, may operate in an information technology (IT) environment. That is, the container orchestration system 24 may include a cluster of multiple computing devices that coordinates an automatic process of managing or scheduling work of individual containers for applications within the computing devices of the cluster. In other words, the container orchestration system 24 may be used to automate various tasks at scale across multiple computing devices. By way of example, the container orchestration system 24 may automate tasks such as configuring and scheduling of containers, provisioning and deployments of containers, determining availability of containers, configuring applications in terms of the containers that they run in, scaling of containers to equally balance application workloads across an infrastructure, allocating resources between containers, performing load balancing, traffic routing and service discovery of containers, performing health monitoring of containers, securing the interactions between containers, and the like. In any case, the container orchestration system 24 may use configuration files to determine a network protocol to facilitate communication between containers, a storage location to save logs, and the like. The container orchestration system 24 may also schedule deployment of containers into clusters and identify a host (e.g., node) that may be best suited for executing the container. After the host is identified, the container orchestration system 24 may manage the lifecycle of the container based on predetermined specifications. In some embodiments, the container orchestration system 24 may be implemented using one or more cloud-based computing devices. Accordingly, the container orchestration system 24 may be partially or wholly implemented using cloud-computing resources.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 26 as container images 28. The container registry 26 may be any suitable data storage or database that may be accessible to the container orchestration system 24. The container image 28 may correspond to an executable software package that includes the tools and data employed to execute a respective application. That is, the container image 28 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 24. The deployment configuration file may be stored in the container registry 26 along with the respective container images 28 associated with the deployment configuration file. The deployment configuration file may include a list of different pods and a number of replicas for each pod that should be operating within the container orchestration system 24 at any given time. Each pod may correspond to a logical unit of an application, which may be associated with one or more containers. The container orchestration system 24 may coordinate the distribution and execution of the pods listed in the deployment configuration file, such that the desired state is continuously met. In some embodiments, the container orchestration system 24 may include a master node that retrieves the deployment configuration files from the container registry 26, schedules the deployment of pods to the connected nodes, and ensures that the desired state specified in the deployment configuration file is met. For instance, if a pod stops operating on one node, the master node may receive a notification from the respective worker node that is no longer executing the pod and deploy the pod to another worker node to ensure that the desired state is present across the cluster of nodes.

As mentioned above, the container orchestration system 24 may include a cluster of computing devices, computing systems, or container nodes that may work together to achieve certain specifications or states, as designated in the respective container. In some embodiments, container nodes 30 may be integrated within industrial control systems 12 as shown in FIG. 1. That is, container nodes 30 may be implemented by the industrial control systems 12, such that they appear as worker nodes to the master node in the container orchestration system 24. In this way, the master node of the container orchestration system 24 may send commands to the container nodes 30 that are also configured to perform applications and operations for the respective industrial equipment.

With this in mind, the container nodes 30 may be integrated with the industrial control systems 12, such that they serve as passive-indirect participants, passive-direct participants, or active participants of the container orchestration system 24. As passive-indirect participants, the container nodes 30 may respond to a subset of all of the commands that may be issued by the container orchestration system 24. In this way, the container nodes 30 may support limited container lifecycle features, such as receiving pods, executing the pods, updating a respective file system to included software packages for execution by the industrial control system 12, and reporting the status of the pods to the master node of the container orchestration system 24. The limited features implementable by the container nodes 30 that operate in the passive-indirect mode may be limited to commands that the respective industrial control system 12 may implement using native commands that map directly to the commands received by the master node of the container orchestration system 24. Moreover, the container node 30 operating in the passive-indirect mode of operation may not be capable to push the packages or directly control the operation of the industrial control system 12 to execute the package. Instead, the industrial control system 12 may periodically check the file system of the container node 30 and retrieve the new package at that time for execution.

As passive-direct participants, the container nodes 30 may operate as a node that is part of the cluster of nodes for the container orchestration system 24. As such, the container node 30 may support the full container lifecycle features. That is, container node 30 operating in the passive-direct mode may unpack a container image and push the resultant package to the industrial control system 12, such that the industrial control system 12 executes the package in response to receiving it from the container node 30. As such, the container orchestration system 24 may have access to a worker node that may directly implement commands received from the master node onto the industrial control system 12.

In the active participant mode, the container node 30 may include a computing module or system that hosts an operating system (e.g., Linux) that may continuously operate a container host daemon that may participate in the management of container operations. As such, the active participant container node 30 may perform any operations that the master node of the container orchestration system 24 may perform. By including a container node 30 operating in the OT space, the container orchestration system 24 is capable of extending its management operations into the OT space. That is, the container node 30 may provision devices in the OT space, serve as a proxy node 32 to provide bi-directional coordination between the IT space and the OT space, and the like. For instance, the container node 30 operating as the proxy node 32 may intercept orchestration commands and cause industrial control system 12 to implement appropriate machine control routines based on the commands. The industrial control system 12 may confirm the machine state to the proxy node 32, which may then reply to the master node of the container orchestration system 24 on behalf of the industrial control system 12.

Additionally, the industrial control system 12 may share an OT device tree via the proxy node 32. As such, the proxy node 32 may provide the master node with state data, address data, descriptive metadata, versioning data, certificate data, key information, and other relevant parameters concerning the industrial control system 12. Moreover, the proxy node 32 may issue requests targeted to other industrial control systems 12 to control other OT devices. For instance, the proxy node 32 may translate and forward commands to a target OT device using one or more OT communication protocols, may translate and receive replies from the OT devices, and the like. As such, the proxy node 32 may perform health checks, provide configuration updates, send firmware patches, execute key refreshes, and other OT operations for other OT devices.

Figure 2:
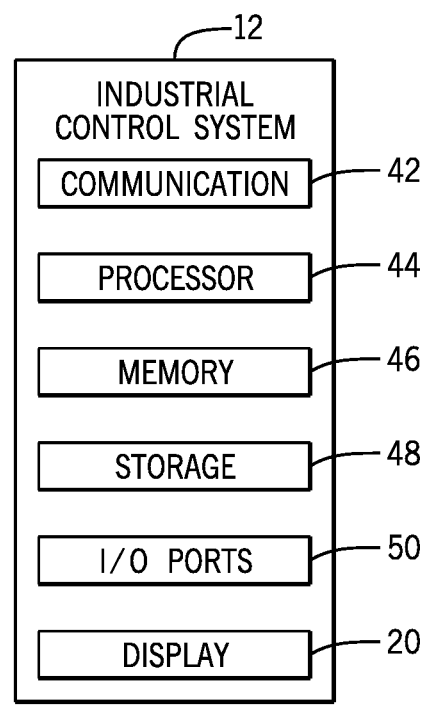
FIG. 2 is a block diagram of an example industrial control system, in accordance with an embodiment.

With the foregoing in mind, FIG. 2 is a block diagram of an example industrial control system 12 that may be used with the embodiments described herein. The industrial control system 12 may include a communication component 42, a processor 44, a memory 46, a storage 48, input/output (I/O) ports 50, a display 20, and the like. The communication component 42 may be a wireless or wired communication component that facilitates communication between the container orchestration system 24 and the industrial control system 12, or any other suitable electronic device. The processor 44 may be any type of computer processor or microprocessor capable of executing computer-executable code. The processor 44 may also include multiple processors that may perform the operations described below.

The memory 46 and the storage 48 may be any suitable article of manufacture that may serve as media to store processor-executable code, data, or the like. These articles of manufacture may represent computer-readable media (i.e., any suitable form of memory or storage) that may store the processor-executable code used by the processor 44 to perform the presently disclosed techniques. The memory 46 and the storage 48 may represent non-transitory computer-readable media (e.g., any suitable form of memory or storage) that may store the processor-executable code used by the processor 44 to perform various techniques described herein. It should be noted that non-transitory merely indicates that the media is tangible and not a signal.

The I/O ports 50 may couple to one or more sensors 18, one or more input devices, one or more displays, or the like to facilitate human or machine interaction with the industrial control system 12. For example, based on a notification provided to a user via a display 20, the user may use an input device to instruct the adjustment of an OT device.

The display 20, as discussed above, may operate to depict visualizations associated with software or executable code being processed by the processor 44. In one embodiment, the display 20 may be a touch display capable of receiving inputs from a user of the industrial control system 12. The display 20 may be any suitable type of display, such as a liquid crystal display (LCD), plasma display, or an organic light emitting diode (OLED) display, for example. Additionally, in one embodiment, the display 20 may be provided in conjunction with a touch-sensitive mechanism (e.g., a touch screen) that may function as part of a control interface for the industrial control system 12.

Although FIG. 2 is depicted with respect to the industrial control system 12, it should be noted that the container orchestration system 24, the container nodes 30, and the proxy node 32 may also include the same or similar components to perform, or facilitate performing, the various techniques described herein. Moreover, it should be understood that the components described with respect to FIG. 2 are exemplary figures and the industrial control system 12 and other suitable computing systems may include additional or fewer components as detailed above.

Figure 3:
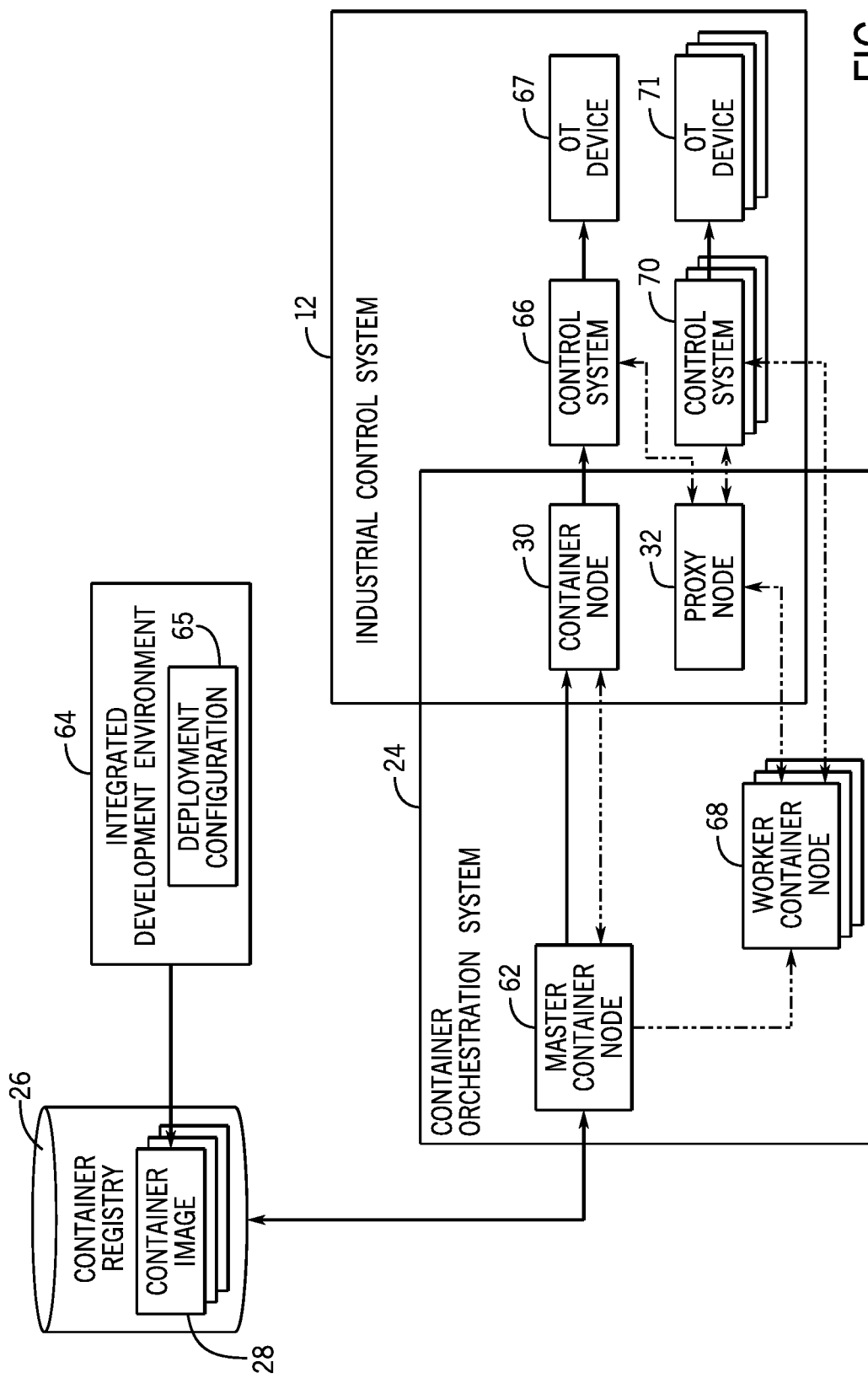
FIG. 3 is a block diagram of an example operational technology (OT) network that coordinates with a container orchestration system, in accordance with an embodiment.

With the foregoing in mind, FIG. 3 illustrates a block diagram that depicts the relative positions of the container node 30 and the proxy node 32 with respect to the container orchestration system 24. As mentioned above, the container orchestration system 24 may include a collection of nodes that are used to achieve a desired state of one or more containers across multiple nodes. As shown in FIG. 3, the container orchestration system 24 may include a master node 62 that may execute control plane processes for the container orchestration system 24. The control plane processes may include the processes that enable the container orchestration system 24 to coordinate operations of the container nodes 30 to meet the desired states. As such, the master container node 62 may execute an application programming interface (API) for the container orchestration system 24, a scheduler component, core resources controllers, and the like. By way of example, the master container node 62 may coordinate all of the interactions between nodes of the cluster that make up the container orchestration system 24. Indeed, the master container node 62 may be responsible for deciding the operations that will run on container nodes 30 including scheduling workloads (e.g., containerized applications), managing the workloads' lifecycle, scaling, and upgrades, managing network and storage resources for the workloads, and the like. The master container node 62 may run an API server to handle requests and status updates received from the container nodes 30.

By way of operation, an integrated development environment (IDE) tool 64 may be used by an operator to develop a deployment configuration file 65. As mentioned above, the deployment configuration file 65 may include details regarding the containers, the pods, constraints for operating the containers/pods, and other information that describe a desired state of the containers specified in the deployment configuration file 65. In some embodiments, the deployment configuration file 65 may be generated in a YAML file, a JSON file, or other suitable file format that is compatible with the container orchestration system 24. After the IDE tool 64 generates the deployment configuration file 65, the IDE tool 64 may transmit the deployment configuration file 65 to the container registry 26, which may store the file along with container images 28 representative of the containers stored in the deployment configuration file 65.

In some embodiments, the master container node 62 may receive the deployment configuration file 65 via the container registry 26, directly from the IDE tool 64, or the like. The master container node 62 may use the deployment configuration file 65 to determine a location to gather the container images 28, determine communication protocols to use to establish networking between container nodes 30, determine locations for mounting storage volumes, locations to store logs for the containers, and the like.

Based on the desired state provided in the deployment configuration file 65, the master container node 62 may deploy containers to the container host nodes 30. That is, the master container node 62 may schedule the deployment of a container based on constraints (e.g., CPU or memory availability) provided in the deployment configuration file 65. After the containers are operating on the container nodes 30, the master container node 62 may manage the lifecycle of the containers to ensure that the containers specified by the deployment configuration file 65 is operating according to the specified constraints and the desired state.

Keeping the foregoing in mind, the industrial control system 12 may not use an operating system (OS) that is compatible with the container orchestration system 24. That is, the container orchestration system 24 may be configured to operate in the IT space that involves the flow of digital information. In contrast, the industrial control system 12 may operate in the OT space that involves managing the operation of physical processes and the machinery used to perform those processes. For example, the OT space may involve communications that are formatted according to OT communication protocols, such as FactoryTalk LiveData, EtherNet/IP, Common Industrial Protocol (CIP), OPC Direct Access (e.g., machine to machine communication protocol for industrial automation developed by the OPC Foundation), or any suitable OT communication protocol (e.g. DNP3, Modbus, Profibus, LonWorks, DALI, BACnet, KNX, EnOcean). Since the industrial control systems 12 operate in the OT space, the industrial control systems are not capable of implementing commands received via the container orchestration system 24.

In certain embodiments, the container node 30 may be programmed or implemented in the industrial control system 12 to serve as a node agent that can register the industrial control system 12 with the master container node 62. For example, the industrial control system 12 may include a programmable logic controller (PLC) that cannot support an operating system (e.g., Linux) for receiving and/or implementing requested operations issued by the container orchestration system 24. However, the PLC may perform certain operations that may be mapped to certain container events. As such, the container node 30 may include software and/or hardware components that may map certain events or commands received from the master container node 62 into actions that may be performed by the PLC. After converting the received command into a command interpretable by the PLC, the container node 30 may forward the mapped command to the PLC that may implement the mapped command. As such, the container node 30 may operate as part of the cluster of nodes that make up the container orchestration system 24, while a control system 66 (e.g., PLC) that coordinates the OT operations for an OT device 67 in the industrial control system 12. The control system 66 may include a controller, such as a programmable logic controller (PLC), a programmable automation controller (PAC), or any other controller that may monitor, control, and operate an industrial automation device or component.

The industrial automation device or component may correspond to an OT device 67. The OT device 67 may include any suitable industrial device that operates in the OT space. As such, the OT device 67 may be involved in adjusting physical processes being implemented via the industrial system 10. In some embodiments, the OT device 67 may include motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.) and the like. In addition, the OT device 67 may also be related to various industrial equipment such as mixers, machine conveyors, tanks, skids, specialized original equipment manufacturer machines, and the like. The OT device 67 may also be associated with devices used by the equipment such as scanners, gauges, valves, flow meters, and the like. In one embodiment, every aspect of the OT device 67 may be controlled or operated by the control system 66.

As such, the control system 66 may perform actions based on commands received from the container node 30. By mapping certain container lifecycle states into appropriate corresponding actions implementable by the control system 66, the container node 30 enables program content for the industrial control system 12 to be containerized, published to certain registries, and deployed using the master container node 62, thereby bridging the gap between the IT-based container orchestrations system 24 and the OT-based industrial control system 12.

In addition, the proxy node 32 may also perform certain supervisory operations based on its analysis of the machine state data of the respective control system 66. As a result of its analysis, the proxy node 32 may issue commands and/or pods to other nodes that are part of the container orchestration system 24. For example, the proxy node 32 may send instructions or pods to other worker container nodes 68 that may be part of the container orchestration system 24. The worker container nodes 68 may corresponds to other container nodes 30 that are communicatively coupled to other control systems 70 for controlling other OT devices 71. In this way, the proxy node 32 may translate or forward commands directly to other control systems 70 via certain OT communication protocols or indirectly via the other worker container nodes 68 associated with the other control systems 70. In addition, the proxy node 32 may receive replies from the control systems 70 via the OT communication protocol and translate the replies, such that the nodes in the container orchestration system 24 may interpret the replies. In this way, the container orchestration system 24 may effectively perform health checks, send configuration updates, provide firmware patches, execute key refreshes, and provide other services to OT devices 71 in a coordinated fashion. That is, the proxy node 32 may enable the container orchestration system to coordinate the activities of multiple control systems 66 and 70 to achieve a collection of desired machine states for the connected OT devices 67 and 71.

Bearing the discussion of FIGS. 1-3 in mind, containers may be utilized for a variety of applications. For example, as discussed below, containers may be implemented on automation devices to replace existing components, add features and functionality (e.g., to devices that may otherwise not be modified), and improve communication (e.g., reduce latency) within industrial automation systems. For example, in the context of FIG. 3, a container node 30 may unpack a container image and push the resultant package to a device (e.g., OT device 67 or one of the OT devices 71) in the industrial control system 12, such that the industrial control system 12 (or, more specifically, the device) executes the package in response to receiving it from the container node 30. As such, controllers within industrial automation systems may be containerized, meaning a physical device (e.g., controller) may be replaced by a software container that can perform all of the operations that the physical device would perform (e.g., to control devices within the industrial automation system). As also described below, in some cases, a container may be implemented on a device by communicatively coupling the device to other hardware onto which the container is installed. Moreover, as also discussed herein, software containers may also be utilized to expand the capabilities of devices in industrial automation systems to enable the devices to perform operations that may otherwise not be performable. Furthermore, as described below, containers may also be utilized to enable devices in the OT side industrial automation systems to analyze data (e.g., perform analytics) that otherwise may have been evaluated in the IT side of the industrial automation systems (e.g., using cloud computing resources).

Figure 4:
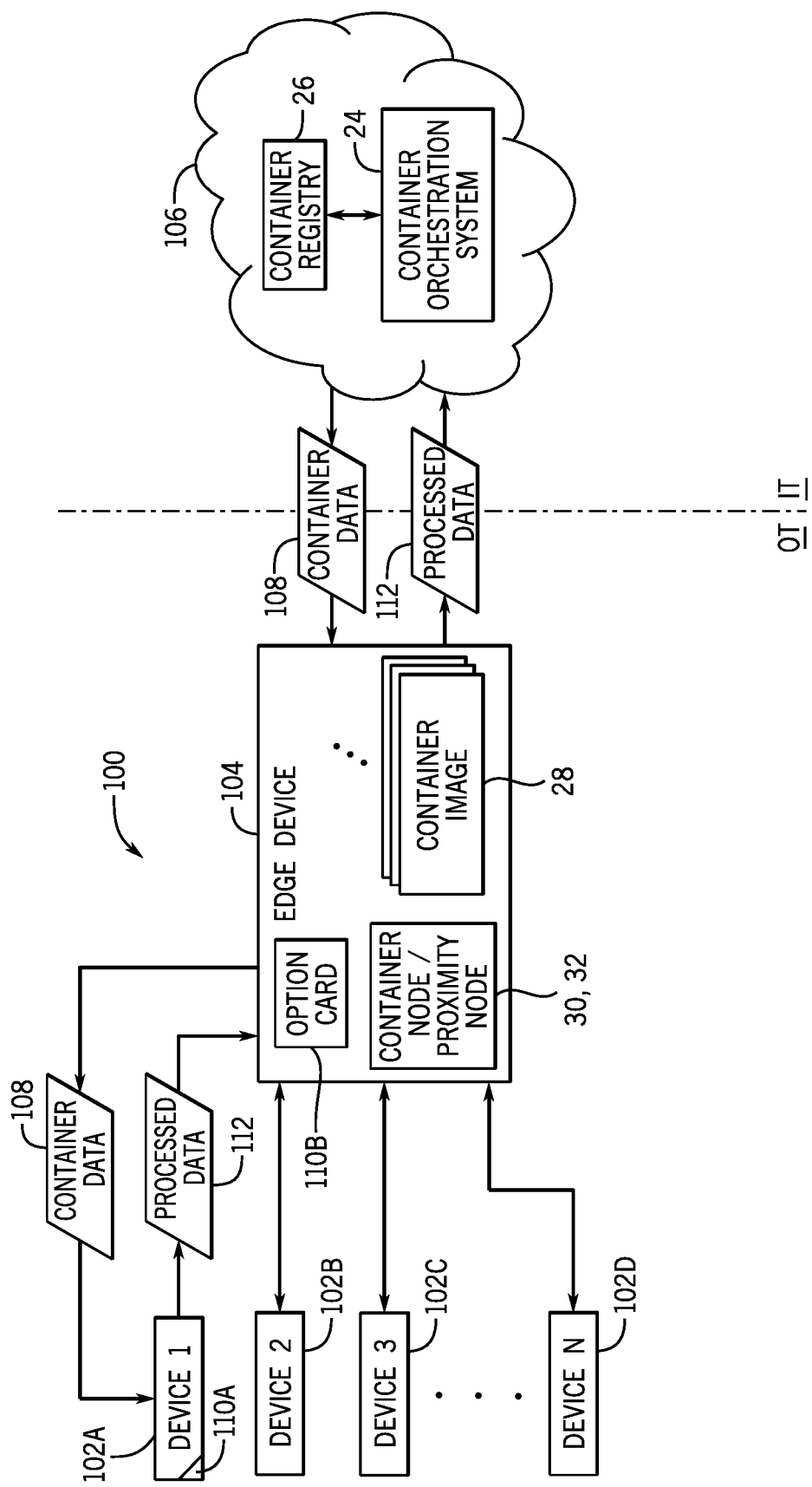
FIG. 4 is a block diagram of an industrial automation system, in accordance with an embodiment.

Keeping this in mind, FIG. 4 is a block diagram of an industrial automation system 100. As illustrated, the industrial automation system 100 includes devices 102 (referring collectively to devices 102A-102D), an edge device 104, and a cloud computing system 106. The industrial automation system 100 may be implemented using components in the industrial automation system 10 of FIG. 1 and FIG. 3. For instance, the devices 102 may be industrial automation devices such as stations 14 (referring collectively to stations 14A-14-H), the conveyer section 16, the sensors 18, the display/operator interface 20, devices that implement the container node 30 and proxy node 32, the OT device 67, and the OT devices 71. The edge device 104 may be the computing system or device that implements the container node 30 or the industrial control system 12 that implements the proxy node 32. The cloud-computing system may be an IT side device or devices that implement the container orchestration system 24 and the container registry 26. The devices 102 and edge device 104 may include the components discussed above with respect to FIG. 2.

Utilizing components of the industrial automation system 10 is one example implementation of the industrial automation system 100. In other embodiments, the devices 102 may be industrial automation devices such as, but not limited to, motor control centers, motors, HMIs, operator interfaces, contactors, starters, sensors, drives, relays (e.g., overload relays), protection devices, switchgear, compressors, network switches (e.g., Ethernet switches, modular-managed, fixed-managed, service-router, industrial, unmanaged, etc.), controllers, and the like. Furthermore, while the industrial automation system 100 is illustrated as having four devices 102, in other embodiments, the industrial automation system 100 may include any suitable number of devices 102 that are communicatively coupled to the cloud computing system 106 via the edge device 104. The devices 102 may implement containers in several ways. For example, as described below, the devices 102 may receive container data 108 from the edge device 104 and implement the container by executing the container data 108 (e.g., using computing resources or processing circuitry of a device 102 itself). Indeed, in some cases, the container (or data for the container) may be embedded within one or more processor cores of the device 102 itself. Also, the devices 102 may be communicatively coupled to hardware that can provide the computing resources (e.g., processing circuitry) for executing the container data 108. As another example, an option card 110A that includes storage onto which the data for a container (e.g., container data 108 has been installed may be installed into one or more of the devices 102 (e.g., device 102A). The option card 110A, which is a physical device (e.g., a printed circuit board) that may connect to the device 102 via a peripheral interface of the device 102, may also include computing resources (e.g., processing circuitry) that may execute the container data 108 to implement the container alone or in conjunction with computing resources of the device 102 regardless of whether the container data 108 was pre-installed on the option card 110A or received from the edge device 104. The option card 110A may be hardware that is added to a device (e.g., one of the devices 102) after manufacture of the device as well as after installation of the device within the industrial automation system 100.

The edge device 104 may be a device a computing device or industrial automation device on the OT side that is communicatively coupled to the device 102 and communicatively couples the devices 102 to the cloud computing system 106, which is located on the IT side. In some embodiments, the edge device 104 may be a device such as a controller or a drive. In any case, the edge device 104 may include processing circuitry (e.g., one or more processors) that executes machine-readable instructions that may be stored on memory or storage (e.g., a non-transitory computer-readable medium) included in the edge device 104. The edge device 104 may also implement a container node 30, proximity node 32, or both. As such, the edge device 104 may receive container data 108 (e.g., corresponding to a container image 28 maintained in the container registry 26) from the cloud computing system 106, unpack a container image, and push the resultant package to one or more of the devices 102, such that the devices 102 may execute the package in response to receiving it from the container node edge device 104. Similar to the devices 102, an option card 110B may also be installed into the edge device 104. The option card 110B is a physical device (e.g., a printed circuit board) that may connect to the edge device 104 via a peripheral interface of the edge device 104. Additionally, the option card 110B may include computing resources (e.g., processing circuitry) that may execute the container data 108 to implement the container alone or in conjunction with computing resources of the edge device 104 regardless of whether the container data 108 was pre-installed on the option card 110B or received from the cloud computing system 106. The option card 110B may be hardware that is added to the edge device 104 after the edge device 104 was manufactured as well as after installation of the edge device 104 within the industrial automation system 100.

The cloud computing system 106 may be implemented using one or more computing devices that have processing circuitry that can execute machine-readable instructions that may be stored on memory or storage (e.g., a non-transitory computer-readable medium) included in cloud computing system 106 or communicatively coupled to the processing circuitry device of the cloud computing system 106.

Regardless of whether a container is implemented on processing circuitry (e.g., one or more computer processors or microprocessors capable of executing computer-executable code) included in one or more of the devices 102, the edge device 104, the option card 110A, or the option card 110B, the container may generate processed data 112, which is data that the container may generate by performing one or more processing or control operations discussed herein. For example, the processed data 112 may include, but is not limited to, control signals, data regarding one or more characteristics of a device (e.g., from performing data analysis), or one or more functions associated with the container. Accordingly, the processed data 112 may be generated by the devices 102 that implement the container or by the edge device 104 that is implementing the container. Additionally, the edge device 104 may send the processed data 112 to the cloud computing system 106, for example, for further processing or to enable the cloud computing system 106 to perform control or management operations. For instance, the container orchestration system 24 may manage the containers deployed within the industrial automation system 10 based on the processed data 112 received from the edge device 104.

Figure 5:
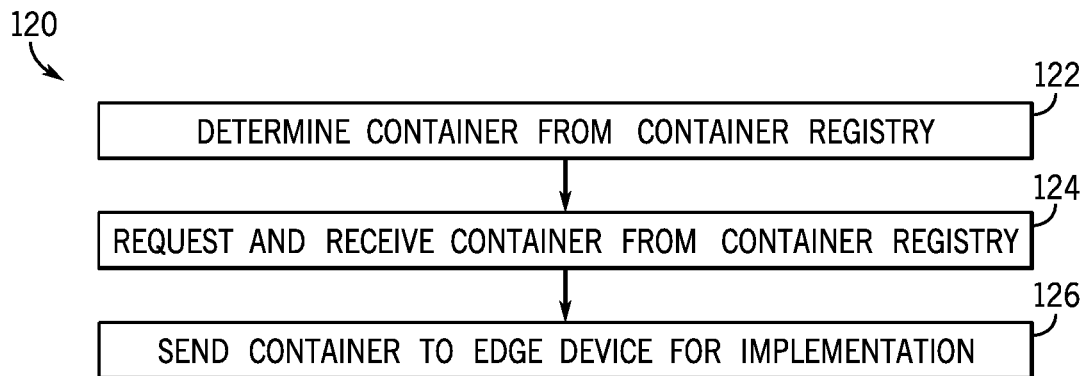
FIG. 5 is a flow diagram of a process for implementing a container onto a device within an industrial automation system, such as the industrial automation system of FIG. 1, FIG. 3, or FIG. 4, in accordance with an embodiment.
Figure 6:
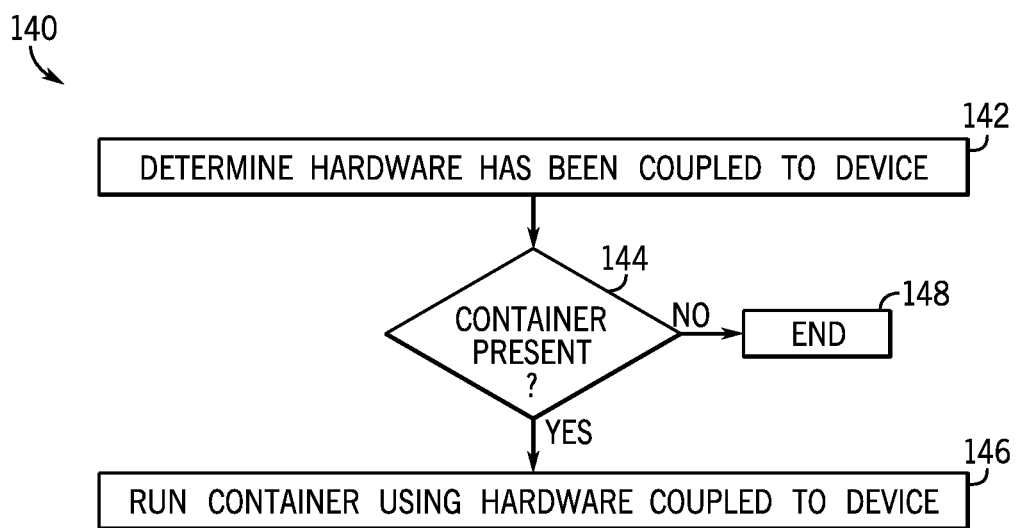
FIG. 6 is a is a flow diagram of another process for implementing a container onto a device within an industrial automation system, such as the industrial automation system of FIG. 1, FIG. 3, or FIG. 4, in accordance with an embodiment.

Before discussing several applications related to utilizing containers in industrial automation systems, FIG. 5 and FIG. 6 will be discussed. FIG. 5 and FIG. 6 are flow diagrams for processes for implementing container on the devices 102 and the edge device 104. In other words, the processes described below with regard to FIG. 5 and FIG. 6 may both be performed to implement a container on the devices 102 or the edge device 104. Keeping this in mind, FIG. 5 is a flow diagram of a process 120 for implementing a container onto a device (e.g., one of the devices 102 or the edge device 104) for which the underlying data for the container (e.g., container image 28) originates from the IT side of the industrial automation system 10, such as from the container registry 26 of the cloud computing system 106.

At process block 122, the container orchestration system 24 may determine a container stored in the container registry 26 that is to be implemented by a device on the OT side of an industrial automation system (e.g., industrial automation system 10, 100). For example, the device may be the edge device 104 or one or more of the devices 102. The container orchestration 24 may determine which container(s) to implement within the industrial automation system 100 based on a request indicated by a user input from a computing device communicatively coupled to the cloud computing system 106, such a computing device of a technician or engineer associated with the industrial automation system 100.

At process block 124, the container orchestration system 24 may request and receive the container (e.g., the container image 28 or data for implementing the container associated with the container image 28) from the container registry 26. That is, in response to receiving a request from the container orchestration system 24 for one or more particular containers, the container registry 26 may provide the requested container(s) to the container orchestration system 24. Furthermore, at process block 126, the container orchestration system 24 may provide the container (e.g., container data 108) to the edge device 104 to be implemented in the industrial automation system 100. In instances when the container is to be implemented by one or more of the devices 102, the edge device 104 may send the container data 108 to the device(s) 102. As such, the container orchestration system 24 may send data for a container (e.g., container data 108) to the edge device 104 or devices 102, and the edge device 104 and devices 102 may implement one or more instances of the container.

Continuing with the drawings, FIG. 6 is a flow diagram of a process 140 for implementing a container onto a device (e.g., one of the devices 102 or the edge device 104) by using hardware (e.g., option card 110A or option card 110B) that may be installed into the devices 102 or edge device 104. The process 140 may be performed by processing circuitry included in the devices 102 or the edge device 104, for example, after the devices 102 and the edge device 104 were installed in the industrial automation system 100.

At process block 142, the device 102 or the edge device 104 may determine that hardware has been coupled to the device 102 or the edge device 104. For example, the hardware may be an option card (e.g., option card 110A or option card 110B) that has been inserted into a peripheral interface of the device 102 or the edge device 104.

At decision block 144, the device 102 or the edge device 104 may determine whether a container is present. For example, the hardware may include storage or memory that includes the container, or the container may be embedded to a processor core of processing circuitry of the hardware, and the device 102 or edge device 104 may receive an indication from the hardware that the container is present on the hardware. When a container is present, at process block 146, the device 102 or edge device 104 may cause the container to be run utilizing processing resources of the hardware installed on the device 102 or the edge device 104. In some embodiments, the container may also be implemented by the processing circuitry of the device 102 or the edge device 104 alone or in conjunction with processing resources of the hardware. If at decision block 144 the hardware is determined to not include a container, the process 140 may end, as denoted by process block 148.

Keeping in mind the potential manners in which containers may be implemented, several applications for containers that are implemented by the devices 102 or the edge device 104 (or both the devices 102 and the edge device 104) are discussed below.

Container-Based Device Control

One application that containers may be used for is controlling devices in industrial automation systems. For example, with reference to FIG. 4, a container may be utilized to control the device 102 on which the container is implemented. For instance, a drive may run a container that may utilize received data (e.g., from devices 102 connected to the drive, the edge device 104) to make decisions that would otherwise be made by physical hardware (e.g., a controller). Accordingly, a container implemented on a device (e.g., device 102 or edge device 104) may receive data from one or more industrial automation devices communicatively coupled to the device, analyze the received data (e.g., to determine one or more control operations for the device or the one or more industrial automation devices), and control the device on which the container is implemented or the one or more devices from which the data was received based on analyzing the received data (e.g., by causing the device to perform the perform the control operation(s) or sending signals or commands to perform the control operation(s)). In other words, a containerized controller may perform any of the operations that a physical controller (e.g., that could be included in the control system 12) may perform. Thus, a container may be utilized to control an industrial automation device such that the container may be utilized in lieu of a physically-implemented controller (e.g., included in the industrial automation device and/or external to the industrial automation device). In other words, a container may replace the functionality that a physically-implemented controller may have such that the industrial automation device that implements the container may not include a physically-implemented controller or be communicatively coupled to a physically-implemented controller. Furthermore, utilizing a containerized controller may enable other control operations to be performed. Some specific examples of features that a containerized controller may have include determining to implement a flying start (e.g., for a motor of the drive) as well as preventing and detecting shear pin faults of the drive. As such, the container may be implemented to on a device and control operation of the device (and connected devices) to perform the control operations that dedicated hardware (e.g., a controller) would otherwise perform to control the device (and connected devices). Furthermore, utilizing containers implemented on the devices 102 perform control processes may reduce the amount of data that would otherwise be communicated within (or out of) an industrial automation system, thereby potentially decreasing latency, freeing up bandwidth, or both. For instance, in the context of FIG. 3, rather than sending data to a controller (e.g., control system 66) and receiving control instructions from the controller, a device (e.g., device 67) onto which a container is implemented may process the data and control the device 67 itself.

Figure 7:
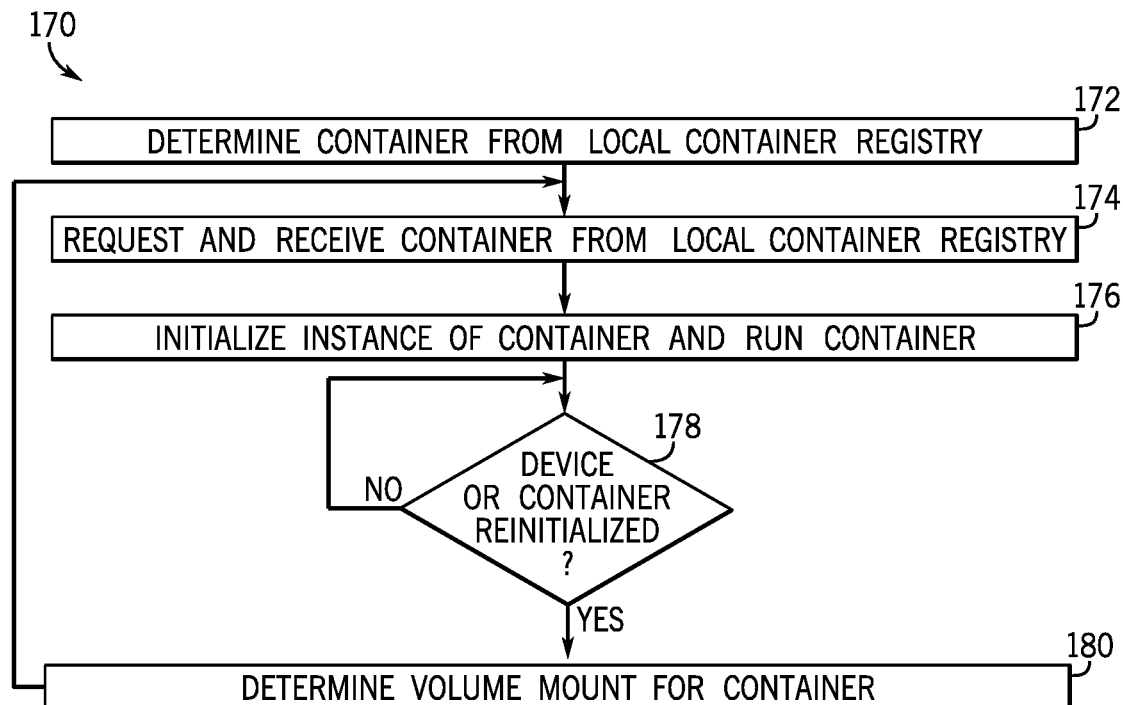
FIG. 7 is a flow diagram of a process for initializing and reinitializing an instance of a container within an industrial automation system, such as the industrial automation system of FIG. 1, FIG. 3, or FIG. 4, in accordance with an embodiment.

Containers implemented by the devices containers may be implemented in conjunction with a control system within a control system of an industrial automation system. For instance, in the context of FIG. 3, the container orchestration system 24 may determine which OT device (e.g., OT device 67) should be used to implement a container, and the control system 66 may be utilized to implement the container on the OT device and to control the container that is implemented on the OT device 67. Bearing this is mind, FIG. 7 is a flow diagram of a process 170 for initializing and reinitializing an instance of a container within an industrial automation system. The process 170 may be performed by the industrial control system 12, the control system 66, or the control system 70 (alone or in conjunction with the container orchestration system 24). Accordingly, while the process 170 is described below as being performed by the control system 66, the process 170 may be performed by other control systems in other embodiments.

At process block 172, the control system 66 may locate a container image that matches a pre-defined container embedded in the control system logic. For example, after powering on, the control system 66 may couple to a local registry of container images 28. The local registry may be maintained within the OT side of the industrial automation system 10 or industrial automation system 100, such as on memory or storage of the control system 66 or an edge device (e.g., edge device 104). In this manner, data for the container may be maintained in a location accessible via one or more OT networks, meaning the container may be implemented without obtaining the container from the IT side of the industrial automation system (e.g., industrial automation system 10, industrial automation system 100) each time the control system 66 is initialized.

At process block 174, the control system 66 may request the container (or data for the container) and receive the container (or data for the container) from the local container registry. At process block 176, the control system 66 may initialize an instance of the container and run the container, for example, on an automation device coupled to the control system 66. For instance, the container may be mounted on storage or memory of the OT device 67 and run using processing circuitry of the OT device 67.

The control system may then operate via the instance of the container image and track any changes to data, files, or other parameters (e.g., state data) during the execution of the instance of the container image. However, if the control system is initialized again due to a crash, loss of power, or other issue, the changes may be lost and a volume mount operation may be implemented to ensure that the data remains consistent across other container image instances that may be using the same data sources.

Keeping this in mind, at decision block 178, the control system 66 or the device onto which the container implemented may determine whether the device or the container (or the control system 66) has been reinitialized. If it is determined that the device that implements the container, the container, or the control system 66 has not been reinitialized, the process may return to decision block 178 (e.g., until determining reinitialization has occurred).

Upon determining that the device that implements the container, the container, or the control system 66 has been reinitialized, at process block 180, the device or the control system 66 may determine a volume mount for the container. In other words, the device or the control system 66 may perform a volume mount operation that specifies a volume (e.g., directory on a disk or other container that provide file systems that preserve data generated by a container) from which to retrieve a container image 28 to re-initialize the container. The container may retrieve the latest version of the container image, which may have been generated based on data available via a volume mount. Subsequently, the process may return to process block 174, and the container may be requested from the volume determine at process block 180. It should be noted that if the container is operating on bare metal (e.g., directly on one or more cores of a processor), the container may be pre-programmed to retrieve a container image from a particular local registry.

In some embodiments, the container images of the local registry may be shared among common devices. For instance, a collection of devices (e.g., drives) could be used as a network (e.g., OT network) of container registry components. That is, although the drives may not have network accessibility outside of the industrial automation system, the drives may be communicatively coupled to each other to provide the network of container registry components that may provide container images and volumes to each other to re-initialize any container image instance that has been lost on one of the collection of drives. This same logic may be applied to option cards that may be communicatively coupled to each other. In some instances, one device or option card may communicate status/state updates to a container registry for other connected containers, thereby providing an update to a registry but limiting the network connectivity to one device. Indeed, one device may populate an update to each other device in the collection.

Figure 8:
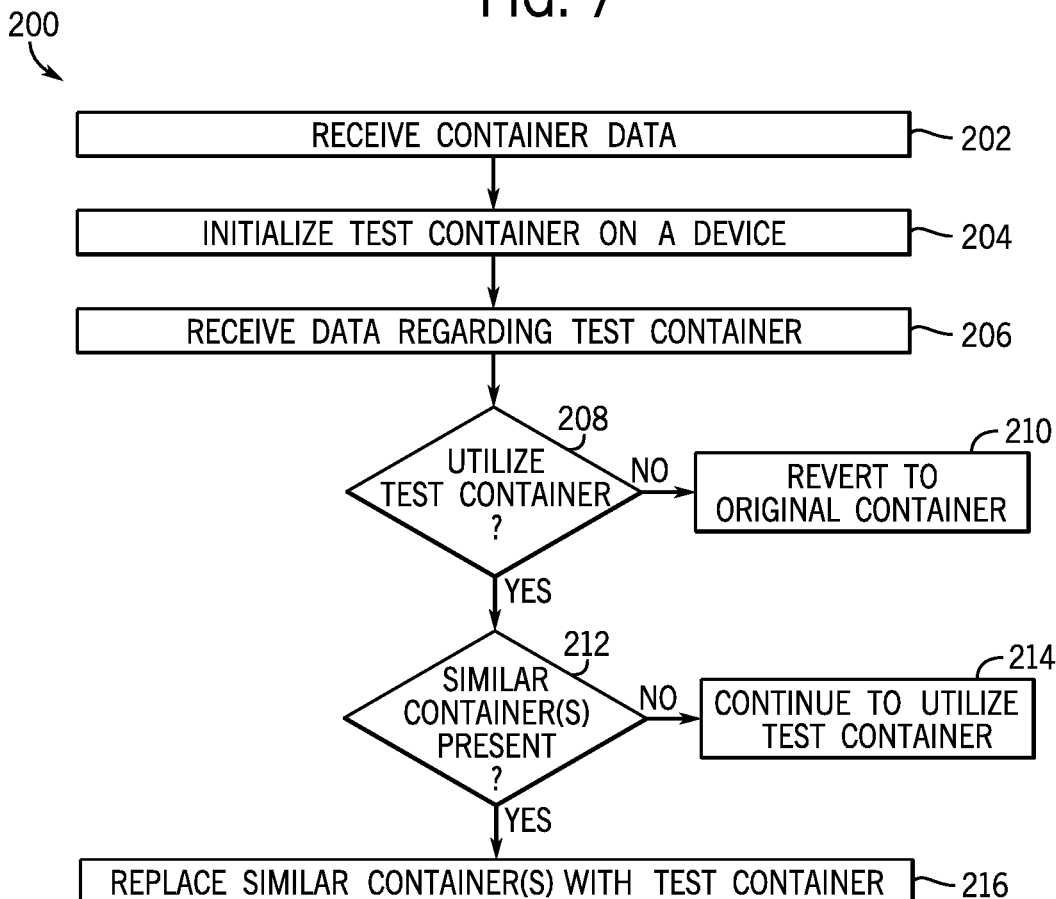
FIG. 8 is a flow diagram of a process for propagating a container within an industrial automation system, such as the industrial automation system of FIG. 1, FIG. 3, or FIG. 4, in accordance with an embodiment.

With this in mind, FIG. 8 is a flow diagram of a process 200 for propagating a container within an industrial automation system. The process 200 may be performed by the container orchestration system 24, for example, in conjunction with an OT device or system that may collect or receive data regarding containers implemented in an industrial automation system. For example, as described below, the process 200 may be performed by the container orchestration system 24 in junction with the edge device 104. However, it should be noted that, in other embodiments, the process 200 may be implemented by the control systems (e.g., control system 66) or the container orchestration system 24 in conjunction with other devices (e.g., devices or systems that include a container node 30 or proxy node 32).

At process block 202, container orchestration system 24 may receive data regarding containers implemented in an industrial automation system, such as the industrial automation system 10 or industrial automation system 100. The data regarding the containers may include performance and health metrics for the containers as well as version data indicating the versions of the containers present. In one embodiment, container nodes 30 within the industrial automation system 10 may collect such data from the devices that implement the containers and send the data to an OT-side device (or system) that processes the data (e.g., cloud computing system 106). In this manner, the containers being executed on a fleet or collection of devices may be monitored.

At process block 204, the container orchestration system 24 may initialize another container on a device. The container may be considered a test container that may be a modified version (e.g., updated version) of an existing container that is to be tested on a device within the industrial automation system 10, for example, prior to providing the updated container to other devices in the industrial automation system 10 that also run instances of the original (e.g., unmodified) version of the container.

At process block 206, the container orchestration system 24 may receive data regarding the test container. For example, the data may be received from the edge device 104 or a container node 30, and the data may be indicative of whether the container has been successfully implemented on the device, is processing data in a desired manner, or controlling the device (or another device) in a desired manner. For example, if the container is for a drive to control itself and other devices coupled to the drive, the data may be indicative of the speed of a motor of the drive as well as the output or operations of the devices connected to the drive.

At decision block 208, the container orchestrations system 24 may determine whether to utilize the test container based on the data received at process block 206. In other words, the container orchestrations system 24 may determine whether to replace an existing container (e.g., original container) with the test container. In some embodiments, the container orchestration system 24 determine whether utilize the test container based on the received data being indicative of the container being successfully initialized and the device (s) associated with the container being controlled or analyzed as desired. In other embodiments, the container orchestration system 24 may determine whether to utilize the test container based on a user input made via a computing device communicatively coupled to the container orchestration system 24. For example, the container orchestration system 24 may provide data to the computing device, and the user of the computing device may be prompted to select whether to utilize the test container via a user interface of the computing device. The container orchestration system 24 may subsequently receive an indication of the user's selection in response to the prompt. If the container orchestration system 24 determines not to utilize the test container, at process block 210, the container orchestration system 24 may revert to the original container, meaning the test container may be removed, and the original container may be reinitialized on the device that had implemented the test container.

However, if at decision block 208 the container orchestration system 24 determines to utilize the test container, at decision block 212, the container orchestration system 24 may determine whether any similar containers are present. Here, "similar" may refer to any containers have the same version as the original container that may have been replaced by the test container. For example, if another instance (or multiple instances) of the same container (e.g., original container) are deployed across the industrial automation system 10, the container orchestration system 24 may determine that a similar container is present. When the container orchestration system 24 determine that there are no similar containers present, at process block 214, the container orchestration system 24 may continue to utilize the test container. In other words, the test container may continue to be implemented on the device onto which the container was implemented.

However, if at decision block 212 the container orchestration system 24 determines that a similar container is present, at process block 216, the container orchestration system 24 may replace the similar container(s) with the test container. In other words, the container orchestration system 24 may propagate changes between the original container and the test container to the devices so that that the devices implement instances of the test container. In some embodiments, the container orchestration system 24 may cause the device onto which the test container was originally implemented to propagate the data for the test container via an OT network to the other devices to enable the other devices to implement the test container. For instance, the device that originally implemented the test container may be the only one device of a fleet of devices utilized the implement a localized container registry that may have access to a network (e.g., an IT network), and the other devices in the fleet may retrieve container images from device in order to implement the test container.

Figure 9:
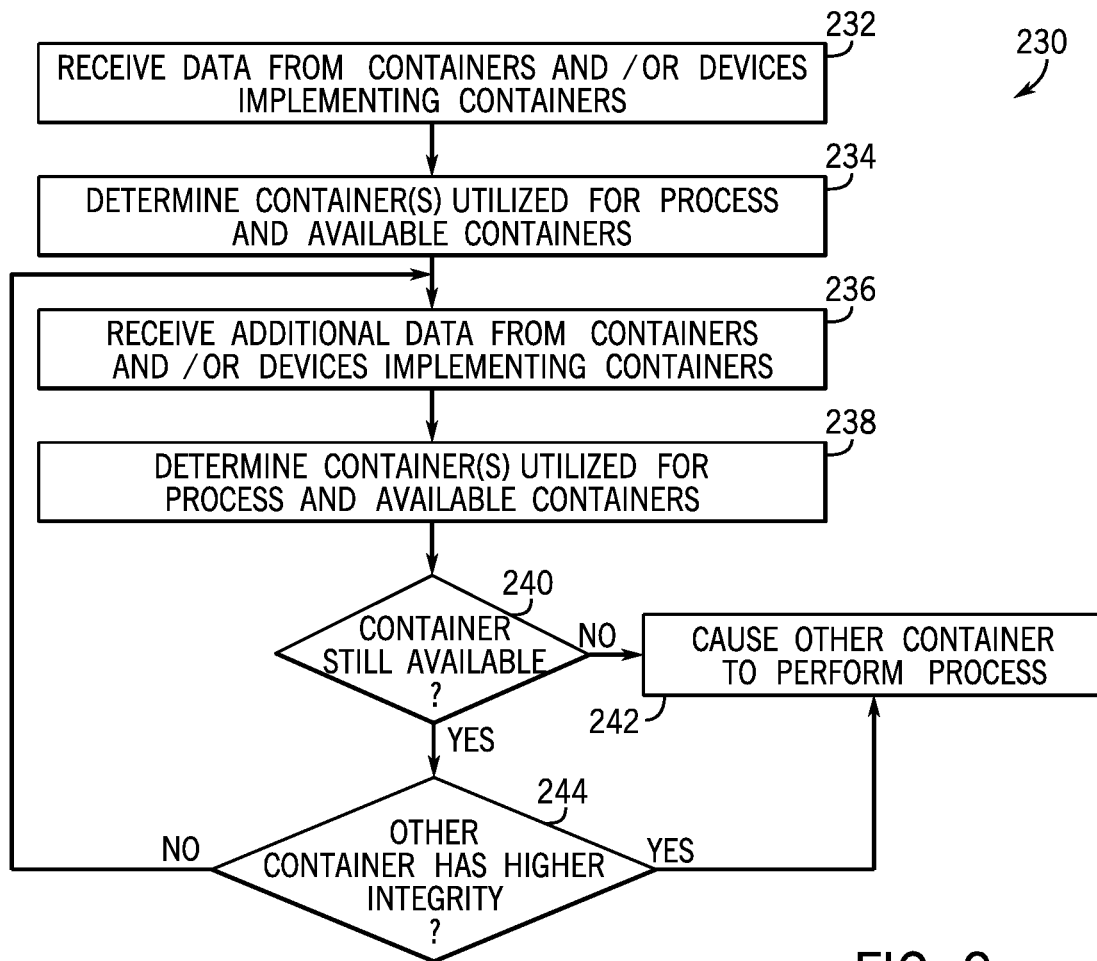
FIG. 9 is a flow diagram of a process for controlling or managing container instances in an industrial automation system, such as the industrial automation system of FIG. 1, FIG. 3, or FIG. 4, in accordance with an embodiment.

As noted above, containers may be implemented on devices in an industrial automation system in several ways. In some instances, multiple instances of a container may be implemented by the same device or by several devices. As such, containers may enable devices to be highly available. For example, two or more container image instances may be operating on a processor core of a single device, an option card, or the like. Alternatively, two different devices (e.g., different devices or two option cards installed within the same device of different devices) may each have a container image instance executed thereon. Accordingly, in the event a container is no longer available or a container with higher integrity becomes available, a process (e.g., device control, data processing, analytics, etc.) may be switched from being performed by one container (or set of containers) to another container (or another set of containers). Bearing this in mind, FIG. 9 is a flow diagram of a process 230 for controlling container instances. The process 230 may be performed by the container orchestration system 24 or by an OT-side device or system capable of managing containers. Thus, while the container orchestration system 24 is described below as performing the process 230, it should be noted that the process 230 may be performed by other systems of devices in other embodiments. As such, in some embodiments, the process 230 may be performed partially or entirely by a system or device that is included in the OT-side of an industrial automation system.

At process block 232, the container orchestration system 24 may receive data from containers implemented in an industrial automation system, such as the industrial automation system 10 or the industrial automation system 100. As noted above, containers may be implemented on several devices in the industrial automation system 10, including multiple containers or instances of the same container implemented on the same device. Accordingly, at process block 232, the container orchestration system 24 may receive data indicative of which containers are implemented in the industrial automation system 10 and whether the containers are active (e.g., being utilized to perform a process such as a control process, process data, or perform analytics). The received may also be indicative of available computing resources (e.g., processor availability such as a value quantifiable in gigahertz) on the devices (including option cards) that implement the containers.

At process block 234, the container orchestration system 24 may determine, based on the received data, which container(s) are being utilized to perform the process as well as which containers are available. For instance, available containers may be container instances that are either currently not performing the process or are containers that are performing the process or a portion of the process but could potentially perform more of the process (e.g., due to having more available computing power or availability by the processing circuitry that executes the container instance). As such, at process block 234, the container orchestration system 24 may determine a baseline for the containers and the devices that implement the containers.

At process block 236, the container orchestration system 24 may receive additional data (e.g., a second set of data) from the containers and/or from the devices that implement the containers. The data may generally be similar to the data received at process block 232 but may be considered updated data. In other words, the data received at process block 232 may be considered baseline data, while the data received at process block 236 may be similar data that is collected at a later time than the baseline data.

At process block 238, the container orchestration system 24 may determine, based on the received data (as received at process block 236), which container(s) are being utilized to perform the process as well as which containers are available. For instance, available containers may be container instances that are either currently not performing the process or are containers that are performing the process or a portion of the process but could potentially perform more of the process (e.g., due to having more available computing power or availability by the processing circuitry that executes the container instance). As such, at process block 234, the container orchestration system 24 may determine an updated baseline for the containers and the devices that implement the containers.

At decision block 240, the container orchestration system 24 may determine whether a container that was utilized (e.g., as determined at process block 234) is still available. For example, in some cases, a container may no longer be available due to the device that implemented the container being powered off or no longer having computing resources available for implementing the container. Upon determining that the container is not available, at process block 242, the container orchestration system 24 may cause an available container (e.g., as determined at process block 238) or containers to be utilized to perform the process. In one embodiment, the container orchestration system 24 may select a container instance that has the greatest amount of available or maximum possible processing power associated with it (e.g., a value for a processor or processor cores that implement the container). In another embodiment, the container orchestration system 24 may select container instance that will perform the process based on reducing communication resources that would be utilized or reducing the amount of times data would be rerouted if the container were utilized. For example, in a control application, data for devices may be sent to one device that implements a container used to control the devices. However, if the container were to become unavailable, using a different container instance implemented by the same device (e.g., by different processing circuitry of the device) may allow the same flow of data within an OT network to be used. A specific example of this would be utilizing the processing resources included in the device when a container implemented on an option card installed in the device is no longer available. In yet another embodiment, the containers may be implemented by container orchestration system 24 in a stateless fashion in which one container may be initiated in a round-robin fashion when the currently executed container is no longer available.

However, if at decision block 240 the container orchestration system 24 determines that the container is still available, at decision block 244, the container orchestration system 24 may determine whether another container (e.g., an available container) has a higher integrity that the container currently being utilized. Here, the integrity of the container may refer to how stable the container is, whether the container is the correct version of the container, or how reliable the container is at performing the process. For example, while a container may be utilized to perform a process, the processing circuitry utilized to implement the container may be subjected to higher processing loads than other processing circuitry that can also run an instance of the same container. As such, the container orchestration system 24 may determine the integrity of a container based on whether processing circuitry associated with container has more available processing power. In response to determining that another container has higher integrity than the currently utilized container, the process may process to process block 242, and, as discussed above, the container orchestration system 24 may the container orchestration system 24 may cause an available container (e.g., as determined at process block 238) or containers to be utilized to perform the process. The container orchestration system 24 may select the container(s) as described above.

If at decision block 244 the container orchestration system 24 determines that no other container has a higher integrity that the container currently being utilized, the process 230 may return to process block 236, and the container orchestration system 24 may receive data regarding containers and the device that implement the containers. As such, the process 230 may be utilized to control which containers are utilized to perform processes (e.g., process data, control devices, perform analytics) within an industrial automation system.

While the process 230 is discussed above as including decision block 240 and decision block 244, in some embodiments, the process 230 may be performed utilizing only the operations discussed above with respect to decision block 240 or decision block 244. In the embodiment in which decision block 240 is omitted, the process 230 may proceed from process block 238 directly to decision block 244. In the embodiment in which decision block 244 is omitted, if at decision block 240 the container orchestration system 24 determines that the container is still available, the process 230 may proceed to process block 236 to receive additional data regarding containers and the devices that implement that containers.

Adding Functionality to Automation Devices Using Containers

As discussed herein, containers may be implemented onto devices in industrial automation systems for several applications, including controlling devices in the industrial automation systems, processing data, and (as discussed below) performing analytics. Utilizing containers may enable devices to have added functionality that otherwise may not be implementable in the devices. For example, as noted above, utilizing a container in conjunction with a drive may enable the drive to be controlled (e.g., by the container the drive implements itself or via a container implemented by an option card installed onto the drive) may enable the drive to perform control operations that the drive may otherwise be unable to perform without the container. Indeed, with reference to FIG. 4, the drive may be device 102A, and the container may be implemented by computing resources (e.g., processing circuitry) of the device 102A. The device 102A may also include the option card 110A, which may include one or more non-transitory computer-readable media with instructions for the container that may be executed by processing circuitry of the option card 110A to implement the container. For instance, in some cases, one or more of the devices 102 may be relatively limited in (available) computing power or available computing resources (to implement the container). Utilizing an option card (e.g., option card 110A) with processing circuitry to implement the container may therefore enable the devices 102 to have functionality that the devices 102 may otherwise not be able to have due to having limited computing abilities (e.g., limited data processing power or bandwidth). Additionally, the container may be implemented on a device that is communicatively coupled to the device 102A (e.g., a drive or other industrial automation device), such as another of the devices 102 or the edge device 104, to enable the device 102A to have new features. As such, containers may be used in conjunction with various control systems of other devices to provide enhanced functionalities via an option card with containers pre-installed or via another device communicatively coupled to the device for which the container pertains. That is, even though various industrial devices may be compute-constrained, containers may enhance the devices' abilities by implementing the container on a separate computing surface such as an option card or another device in an industrial automation system that is communicatively coupled (e.g., through an OT network) to the devices.

Figure 10:
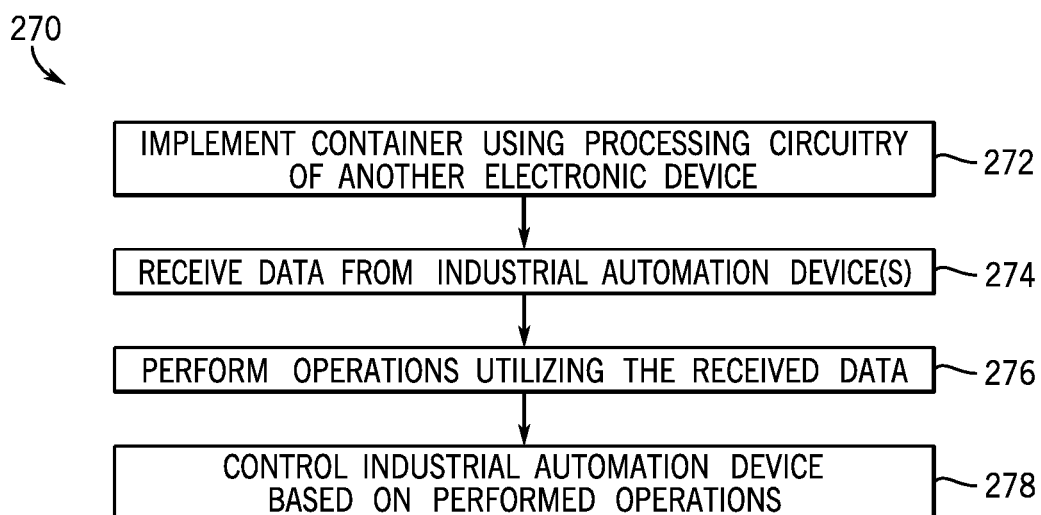
FIG. 10 is a flow diagram of a process for utilizing a container (or multiple container images) to perform operations for or on a device to enable to the device to perform one or more new operations, in accordance with an embodiment.
Figure 11:
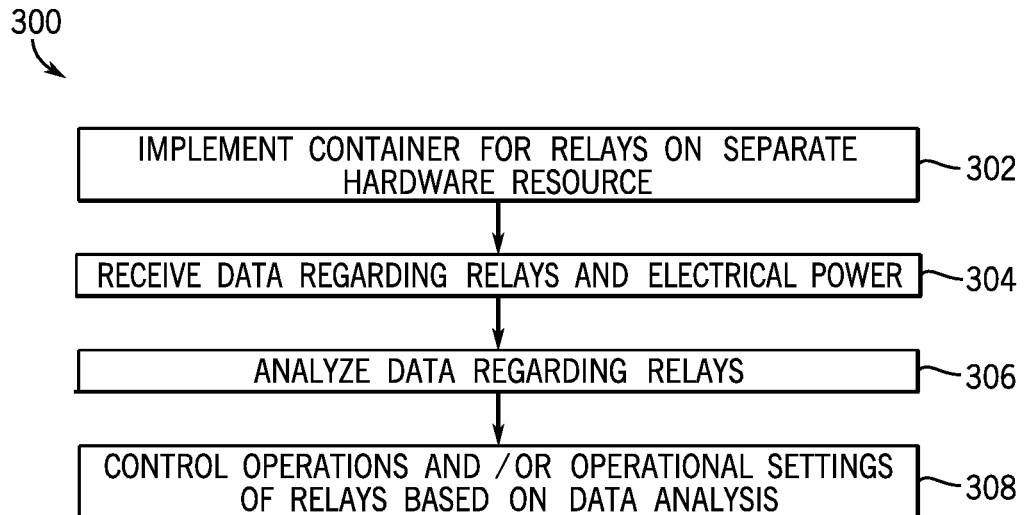
FIG. 11 is a flow diagram of a process for utilizing a container to control operations or operational settings of one or more relays (e.g., overload relays) that may be included in an industrial automation system, in accordance with an embodiment.

Keeping this in mind, FIG. 10 and FIG. 11 are discussed below to elaborate on more examples of how containers may be utilized to expand the functionality of devices within an industrial automation system, such as the devices 102 of the industrial automation system 100 of FIG. 4. FIG. 10 is a flow diagram of a process 270 for utilizing a container (or multiple container images) to perform operations for or on a device to enable to the device to perform one or more new operations. The new operations may be operations that the device would be unable to perform without utilizing the container(s). The process 270 may be performed at least in part by a container and the processing circuitry utilized to implement the container, which may include processing circuitry that is included on another device, such as processing circuitry of an edge device or processing circuitry of an option card that may be installed into the device or another device communicatively coupled to the device (e.g., via an OT network), such as an edge device. With that said, it should be noted that, in other embodiments, the process 270 may be performed utilizing a container that is implemented using computing resources included in the device for which the container will be utilized (e.g., to control the device or analyze data associated with or generated by the device).

At process block 272, a container that will be utilized in conjunction with an industrial automation device may be implemented on a hardware resource other than those included in the industrial automation device. For example, in the context of FIG. 4, the devices may be one or more of the devices 102 that are communicatively coupled to the edge device 104 via one or more OT networks. The container may be implemented by processing circuitry of the edge device 104, processing circuitry of the option card 110A that may be installed into one of the devices 102 (e.g., device 102A), or processing circuitry of the option card 110B that may be installed onto the edge device 104. In embodiments in which the container is implemented using the option card 110A, the option card 110A may be installed onto a device for which the container will be used or another of the devices 102 that is communicatively coupled to the device for which the container will be used. For example, a device 102 in the industrial automation system 100 may be able to perform a first set of operations by executing software instructions using processing circuitry included in the device 102 (e.g., originally-included processing circuitry). However, a container may be implemented to enable the device 102 to perform one or more other operations (e.g., operations not included in the first set of operations), and the container may be implemented by processing circuitry included in the edge device 104, option card 110A, option card 110B, or a combination thereof.

At process block 274, the processing circuitry that implements the container may receive data from and/or regarding one or more industrial automation devices, which may include the devices 102 and the edge device 104. The data may include information regarding the devices 102, the edge device 104, and the industrial automation system 100, including, but not limited to, a map of the industrial automation system 100 (e.g., representative of physical connections or network connections between devices (e.g., within an OT network, IT network, or between OT and IT networks), current and historical data regarding components within the industrial automation system 100 (e.g., configuration data, electrical power data, telemetry data, networking data, maintenance histories, operational histories, etc.).

At process block 276, the processing circuitry, utilizing the container it implements, may perform one or more operations utilizing the data received at process block 274. That is, the container (and processing circuitry) may be utilized to process or analyze the received data, for instance, to make a control decision regarding the device(s) 102 that the container may be used to control, and the data analysis and control decision may not have been previously performable without the container. For example, the container may be utilized to analyze power consumption data or other forms of data generated by or regarding the devices 102, the edge 104, or another device included in the industrial automation system 100. The container may also be utilized to determine a state of one or more of the devices 102. In any case, the operations (e.g., analysis) performed utilizing the container at process block 276 may include operations that the one or more devices 102 (or processing circuitry of the one or more devices 102) are incapable of performing or not configured to perform (e.g., as manufactured or as originally installed within the industrial automation system 100) or be associated with a control function (e.g., a mode of operation) that the one or more devices 102 (or processing circuitry of the one or more devices 102) are incapable of performing or not configured to perform. Thus, the container may be utilized to perform new forms of data analysis that had previously not been performed by or regarding the devices 102 (or the edge device 104), for instance, as part of utilizing the container to perform a control operation of function that cannot be performed without the container.

At process block 278, the processing circuitry (e.g., using the container implemented by the processing circuitry) may control the industrial automation device(s) associated with the container based on the operations performed at process block 276. More specifically, the processing circuitry may control the industrial automation device (e.g., one or more of the devices 102) to perform an operation or function that the device 102 may have previously been unable to perform. For example, in the case of a motor of a drive, the processing circuitry (in conjunction with the container) may implement a flying start operation. As another example, the processing circuitry may detect and prevent shear pin faults of the drive. As yet another example, the container may enable vertical lift operations, coordinated pump system operations, or other coordinated conveyance systems to be able to run a physical application with relatively more (e.g., compared to previous) more control of the loads. Furthermore, the containers may also be used to provide coordinated drive systems to operate dynamically with respect to each other. Indeed, the containers may also be implemented on disparate systems that are not connected to each other to deliver additional functionality to these devices that accounts for the others' operations. Thus, the container, or multiple instances of a container, may be utilized to enable devices to cooperate in a manner previously unavailable (e.g., prior to utilizing the container instance(s)).

Before proceeding to FIG. 11, it should be noted that by providing added functionalities to devices via containers, a supervisory system may be able push specific capabilities down to an edge device or other suitable device to allow the device to provide a new function without rolling out a new software release. For example, the cloud computing system 106 may be able to provide containers to the edge device 104 to be implemented on the edge device 104, option card 110A, or option card 110B. Moreover, the containers can initiate various types or processes without worrying about any dependencies that may be related to the operation of the respective device. Indeed, because container images are immutable, the configuration settings of the container may remain as new container images are pushed down to the device. As such, as new versions of container images are pulled from the container registry 26 and executed on a device (e.g., edge device 104, option card 110A, option card 110B), the respective control system (e.g., industrial control system 12) or container orchestration system (e.g., container orchestration system 24) for the container or device may verify that the new container uses the same configuration settings to verify that the new container image instance may operate effectively. In this way, containers may be provided to devices in the OT space to perform a variety of operations including shaping data, pushing firmware updates, providing higher fidelity control models, implementing enhanced analytic applications, increasing optimization of safety and control operations, and the like.

Continuing with the drawings, FIG. 11 is a flow diagram of a process 300 for utilizing a container to control operations or operational settings of one or more relays (e.g., overload relays) that may be included in an industrial automation system. The process 300 may be performed at least in part by a container that is implemented by processing circuitry included on a device other than the relays, such as processing circuitry of an edge device or processing circuitry of an option card that may be installed into one or more of the relays or another device communicatively coupled to the drives (e.g., via an OT network), such as an edge device. With that said, it should be noted that, in other embodiments, the process 300 may be performed utilizing a container that is implemented using computing resources included in one or more of the relays.

At process block 302, a container for relays in an industrial automation system may be implemented on a hardware resource other than processing circuitry included in the relays. For example, in the context of FIG. 4, one or more of the devices 102 may be relays that are communicatively coupled to the edge device 104 via one or more OT networks. The container may be implemented by processing circuitry of the edge device 104, processing circuitry of the option card 110A that may be installed into one of the devices 102, or processing circuitry of the option card 110B that may be installed onto the edge device 104. In embodiments in which the container is implemented using the option card 110A, the option card 110A may be installed onto a relay or another of the devices 102 that is communicatively coupled to the relay(s) included in the industrial automation system 100.

The container may be utilized to monitor the relays to control the relays and to adjust operational settings of the relays. For example, overload relays may be utilized in industrial automation system to protect electric motors against overloads and phase failure. More specifically, an overload relay may receive electrical current that is to be provided to a motor (e.g., a motor included in a drive) and sense the overloading of the motor based on the current. Overloading occurs when a motor draws current above the motor's rated value (e.g., for a particular amount of time or a prolonged amount of time). In response to detecting an overload, the overload relay can interrupt the flow of electrical current to the motor, for instance, to protect the motor from overheating and to protect the motor from being damaged. Overload relays may also protect motors from phase loss (also known as phase failure) and phase imbalance. Motors may be three-phase alternating current (AC) motors that receive three-phase electrical power. Phase loss occurs when one of the phases is lost, meaning the phase is no longer provided to the motor. Phase loss phase loss can be caused by a blown fuse, thermal overload, a broken wire, a worn contact, or a mechanical failure. Phase imbalance occurs when one of the three phases of a three-phase supply are not of equal magnitude. As discussed below, to determine when an overload, phase loss, or phase imbalance has occurred (or may occur), the container may receive electrical power data and utilize one or more curves (e.g., overload protection curves) or threshold values.

Returning to FIG. 11 and the discussion of the process 300, at process block 304, the container may receive data regarding the relays and electrical power in the industrial automation system 100. For instance, the container may receive data indicative of the electrical power and characteristics of the electronic power (e.g., phase data, voltage values, current amperages, etc.) received by each relay overseen by the container. Furthermore, the data regarding the relays may include a mapping of the industrial automation system 100 (e.g., a floorplan) indicative of the locations of the relays. The data regarding the relays may also include historical data regarding relays (e.g., previously captured power data) as well as values or curves to be utilized and/or modified by the container. For example, the container may have or receive one or more curves (e.g., overload protection curves) or threshold values utilized by each relay.

At process block 306, the container may analyze the received data regarding the relays, for example, to determine whether to control operations or operational settings of the relays. For instance, one or more instances of a container may be used to coordinate operations of relays to control settings, shapes of overload protection curves, and the like. That is, different overload relay operations may be dynamically adjusted to coordinate protection schemes between each other, provide dynamic tightening and loosening of protection bands provided by the relays, provide faults or current interruption, and the like. As such, the container (or instances of a container) may analyze received data to determine whether a fault (e.g., overload, phase loss, or phase imbalance) is present (e.g., to cause the flow of electrical power to be disrupted), whether to adjust the overload protection curves, and whether to adjust protection bands provided by the relays.

At process block 308, the container may control the operations of the relays or the operations settings of the relayed based on the analysis of the data performed at process block 306. For example, the container (or processing circuitry that implements the container) may cause one or more of the relays to trip to stop electrical current from reaching one or more motors in the industrial automation system 100. As another example, the container may adjust the overload protection curves for relays or the protections bands provided by the relays. In this manner, containers may be utilized to control the operations of relays as well as the operational settings of relays.

Performing Analytics for Automation Systems and Devices Using Containers

In addition to (or in combination with) the techniques described above, one or more containers (or instances of the same container) may be implemented on an automation device to perform analytics or other calculations that would otherwise be performed elsewhere. For example, rather than sending data to an edge device that would send the data to be processed by a cloud computing system, a container may be utilized to process the data. In the case of drives, each drive could implement a container so that the drives can perform their own analytics. Because of this, less data may be sent to and from higher-level devices or systems, such as controllers or a cloud computing system, thereby increasing bandwidth within networks (e.g., OT networks) of an industrial automation system. Thus, a container may be utilized to pre-process data (e.g., raw data generated by one or more industrial automation devices) in the sense that the data can be processed or analyzed by a container that is executed locally (e.g., implemented by an industrial automation device) rather than sending the raw data to another computing system (e.g., a cloud computing system) to process or analyze the data.

Figure 12:
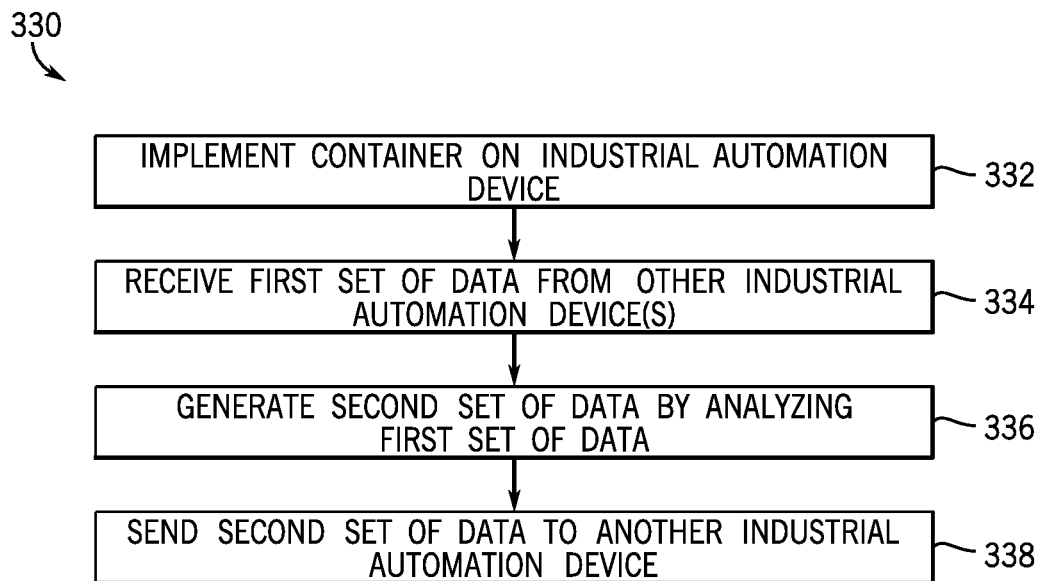
FIG. 12 is a flow diagram for a process of performing analytics utilizing a container implemented on an industrial automation device, in accordance with an embodiment.

Bearing this is mind, FIG. 12, which is a flow diagram for a process 330 of performing analytics utilizing a container implemented on an industrial automation device, will now be discussed. As the process 330 and operations of the process 330 are discussed below, example contexts for the operations are provided to help demonstrate the many applications for which containers may be utilized within industrial automation systems to analyze data. The process 330 may be performed at least in part by a container and the processing circuitry utilized to implement the container, which may include processing circuitry that is included on another device, such as processing circuitry of an edge device or processing circuitry of an option card that may be installed into the device or another device communicatively coupled to the device (e.g., via an OT network), such as an edge device. With that said, it should be noted that, in other embodiments, the process 330 may be performed utilizing a container that is implemented using computing resources included in the device for which the container will be utilized (e.g., to control the device or analyze data associated with or generated by the device).

At process block 332, a container may be implemented on an industrial automation device. For example, in the context of FIG. 4, the industrial automation device may one or more of the devices 102 or the edge device 104. The container may be implemented by processing circuitry one of the devices, process circuitry of the edge device 104, processing circuitry of the option card 110A that may be installed into one of the devices 102 (e.g., device 102A), or processing circuitry of the option card 110B that may be installed onto the edge device 104. Returning to FIG. 12, it should also be noted that, in some embodiments, multiple instances of a container may be implemented by multiple devices at process block 332. For example, more than one of the devices 102 may implement an instance of the container using the processing circuitry of the devices 102, processing circuitry of the option card 110A (or multiple option cards 110A), or a combination thereof.

At process block 334, the processing circuitry that implements the container may receive a first set of data from one or more industrial automation devices that are communicatively coupled to the processing circuitry (e.g., via an OT network). The one or more industrial devices may include the devices 102 and the edge device 104. The data may include information regarding the devices 102, the edge device 104, and the industrial automation system 100, including, but not limited to, a map of the industrial automation system 100 (e.g., representative of physical connections or network connections between devices (e.g., within an OT network, IT network, or between OT and IT networks), current and historical data regarding components within the industrial automation system 100 (e.g., configuration data, electrical power data, telemetry data, networking data, maintenance histories, operational histories, etc.) energy consumption data, voltage data, electrical current data, rotor speed data, a quantity of operations performed (e.g., by a particular device 102), an amount of items produced (e.g., by a particular device 102), or any combination thereof.

At process block 336, the processing circuitry, utilizing the container it implements, may generate a second set of data by analyzing the first set of data. For instance, in the context of FIG. 4, the container may be implemented by processing circuitry of the option card 110A that has been installed on the device 102A, the container may have received data (e.g., the first set of data from process block 334) from one or more of the devices 102B, 102C, 102D, and the container may analyze the data to generate another set of data, which may be the processed data 112. That is, the container (and processing circuitry) may be utilized to process or analyze the received data (e.g., energy consumption data, voltage data, electrical current data, rotor speed data, a quantity of operations performed (e.g., by a particular device 102), an amount of items produced (e.g., by a particular device 102)). The container may perform any suitable form of data analysis that may otherwise be performed by the cloud computing system 106. For example, the container may enable an artificial intelligence (AI) feature that may optimize control parameters for the respective devices based on the analysis performed at process block 336. The container may also be used to perform analysis related to controlling devices as well as maintenance (e.g., preventative or corrective maintenance) for components of the industrial automation system 100. By way of example, a container may receive information such as voltage and current signature data. The container may process the received information and determine rotor bar health and stator health data for rotational components related to the received voltage and signature data. Accordingly, the container may perform analyses to monitor the health of the devices 102 (and edge device 104), perform predictive analysis (e.g., using one or more models of the industrial automation system 100), generative schedule preventative maintenance schedules, and the like.

Returning to FIG. 12 and the discussion of the process 330, at process block 338, the processing circuitry (e.g., using the container implemented by the processing circuitry) may send the second set of data (e.g., as generated at process block 336) to another industrial automation device. For instance, the device 102A may send the processed data 112 to the edge device 104, which may then send the processed data 112 to the cloud computing system 106. In embodiments in which the edge device 104 implements the container, the edge device 104 may generate the processed data 112 and send the processed data 112 to the cloud computing system 106. In some cases, the container image instances utilized may extract device profile data to provide contextual data (e.g., metadata or data tags within the second set of data) regarding the devices 102 or edge device 104 for which the second set of data and/or types of data to which the second set of data pertains. Accordingly, the cloud computing system 106 may receive the processed data 112 and determine one or more contexts for received data, for instance, to better understand interdependencies between various devices or to update a model of the industrial automation system 100 implemented using the cloud computing system 106. In any case, by utilizing containers implemented using computing resources within the OT side of the industrial automation system 100, data may be processed locally, which may reduce the amount of data that is communicated within the in industrial automation system 100, thereby increasing the amount of bandwidth available to communicative data within the industrial automation system.

In embodiments in which data analysis is performed for control purposes, the processing circuitry that implements the container may also control the device that includes the processing circuitry, one or more other devices, or both. In other words, based on the analysis performed at process block 336, the container (and processing circuitry implementing the container) may determine to modify the operation of a component of the industrial automation system 100, and the processing circuitry that implements the container may send one or more commands (e.g., signals) to cause the operation of the component to be modified. In this manner, device control may be performed using containers, thereby reducing the amount of data to be communicated within the industrial control system 12. Furthermore, in embodiments in which a controller receives the second set of data (e.g., from one of the devices 102), the data processing bandwidth of the controller may be relatively higher (e.g., compared to not using a container) because the controller would no longer receive and process raw data (e.g., the first set of data that is analyzed to generate the second set of data).

Furthermore, it should be noted that multiple instances of containers may be utilized to analyze different portions of the first set of data. For example, device 102A (e.g., a first drive) may implement a first instance of a container utilized to generate processed data 112 regarding the device 102B, while device 102C (e.g., a second drive) may implement a second instance of the container utilized to generate processed data 112 regarding the device 102D. The edge device may receive the processed data 112 from the devices 102A, 102C and send the processed data 112. Accordingly, data analysis for multiple devices in an industrial automation system may be apportioned to any suitable number of container instances within the industrial automation system, and data for the devices may be processed using the container instances.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the presently disclosed embodiments have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. An industrial automation device comprising:
   first processing circuitry configured to perform a first set of operations associated with controlling the industrial automation device or one or more industrial automation devices communicatively coupled to the industrial automation device;
   peripheral interface circuitry disposed on the industrial automation device and configured to receive a printed circuit board, wherein the printed circuit board is configured to be inserted into the peripheral interface circuitry and comprises second processing circuitry configured to execute computer-readable instructions to:
      determine whether one or more software containers are present within the printed circuit board after the printed circuit board is inserted into the peripheral interface circuitry;
      in response to determining that the one or more software containers are present within the printed circuit board, executing the one or more software containers via computing resources of the printed circuit board and the first processing circuitry,
      wherein the one or more software containers are configured to:
         receive data from the industrial automation device, the one or more industrial automation devices, or both;
         perform a second set of operations that differs from the first set of operations, wherein the second set of operations is associated with controlling the industrial automation device or the one or more industrial automation devices; and
         adjust one or more operations of the industrial automation device or the one or more industrial automation devices based on the second set of operations.

2. The industrial automation device of claim 1, wherein the industrial automation device is a drive.

3. The industrial automation device of claim 2, wherein the second set of operations comprises detecting a shear pin fault of the drive or implementing a flying start for a motor of the drive.

4. The industrial automation device of claim 1, wherein the first processing circuitry is incapable of performing the second set of operations.

5. The industrial automation device of claim 1, wherein the industrial automation device comprises an edge device configurable to communicatively couple the industrial automation device to a cloud computing system.

6. The industrial automation device of claim 1, wherein the industrial automation device comprises an overload relay.

7. The industrial automation device of claim 6, wherein the second set of operations comprises determining detecting occurrence of an overload condition, a phase loss condition, a phase imbalance condition, or any combination thereof.

8. The industrial automation device of claim 1, wherein the printed circuit board comprises a non-transitory computer readable medium comprising the computer-readable instructions.

9. The industrial automation device of claim 2, wherein the second set of operations comprises detecting a shear pin fault.

10. The industrial automation device of claim 4, wherein:
    the industrial automation device is a drive; and
    the second set of operations comprises detecting a shear pin fault of the drive or implementing a flying start for a motor of the drive.

11. An industrial automation device, comprising:
    first processing circuitry configured to perform a first set of operations associated with controlling the industrial automation device or one or more industrial automation devices communicatively coupled to the industrial automation device;
    interface circuitry disposed on the industrial automation device and configured to receive an option card, wherein the option card is configured to be inserted into the interface circuitry and comprises second processing circuitry and a non-transitory computer readable medium having computer-readable instructions, wherein the second processing circuitry is configured to execute the computer-readable instructions to:
       determine whether one or more software containers are present within the option card after the option card is inserted into the interface circuitry;
       in response to determining that the one or more software containers are present within the option card, executing the one or more software containers via computing resources of the option card and the first processing circuitry,
       wherein the one or more software containers are configured to:
          receive data from the industrial automation device, the one or more industrial automation devices, or both;
          perform a second set of operations that differs from the first set of operations, wherein the second set of operations is associated with controlling the industrial automation device or the one or more industrial automation devices; and adjust one or more operations of the industrial automation device or the one or more industrial automation devices based on the second set of operations.

12. The industrial automation device of claim 11, wherein the industrial automation device comprises a drive.

13. The industrial automation device of claim 11, wherein the industrial automation device comprises an edge device configurable to communicatively couple the industrial automation device to a cloud computing system.

14. The industrial automation device of claim 13, wherein the computer-readable instructions correspond to container data received from the cloud computing system.

15. The industrial automation device of claim 14, wherein the first processing circuitry is incapable of performing the second set of operations.

16. An industrial automation device, comprising:

first processing circuitry configured to perform a first set of operations associated with controlling the industrial automation device or one or more industrial automation devices communicatively coupled to the industrial automation device;

input/output (I/O) circuitry communicatively couplable to an edge device configured to communicatively couple the industrial automation device to a cloud computing system, wherein the edge device comprises peripheral interface circuitry disposed on the industrial automation device and configured to receive an option card, wherein the option card is configured to be inserted into the peripheral interface circuitry and comprises second processing circuitry configured to execute computer-readable instructions to:

determine whether or one or more software containers are present within the option card after the option card is inserted into the peripheral interface circuitry;

in response to determining that the one or more software containers are present within the option card, executing the one or more software containers via computing resources of the option card and the first processing circuitry, wherein the one or more software containers are configured to:

receive data from the industrial automation device, the one or more industrial automation devices, or both;

perform second set of operations that differs from the first set of operations, wherein the second set of operations is associated with controlling the industrial automation device or the one or more industrial automation devices; and adjust one or more operations of the industrial automation device or the one or more industrial automation devices based on the second set of operations.

17. The industrial automation device of claim 16, wherein the edge device is a drive.

18. The industrial automation device of claim 17, wherein the second processing circuitry is configured to cause the edge device to control a motor of the drive based on performing the second set of operations.

19. The industrial automation device of claim 16, wherein:

the one or more industrial automation devices comprise a relay and a drive; and the first set of operations comprise causing the relay to interrupt a flow of electrical power to a motor of the drive.

20. The industrial automation device of claim 19, wherein the relay comprises an overload relay.

* * * * *